United States Patent
Tanaka et al.

(10) Patent No.: US 8,381,644 B2
(45) Date of Patent: Feb. 26, 2013

(54) MOTOR DRIVE CONTROL DEVICE

(75) Inventors: Yasuhiko Tanaka, Machida (JP); Kenji Suzuki, Atsugi (JP); Hiroshi Nagase, Sagamihara (JP); Toshihiko Yamamoto, Chiba (JP); Shunsuke Matsunaga, Narashino (JP)

(73) Assignees: Aida Engineering, Ltd., Kanagawa (JP); Hitachi Industrial Equipment Systems Co., Ltd., Tokyo (JP)

( * ) Notice: Subject to any disclaimer, the term of this patent is extended or adjusted under 35 U.S.C. 154(b) by 411 days.

(21) Appl. No.: 12/698,596

(22) Filed: Feb. 2, 2010

(65) Prior Publication Data
US 2010/0192788 A1    Aug. 5, 2010

(30) Foreign Application Priority Data
Feb. 2, 2009   (JP) ................................. 2009-021369

(51) Int. Cl.
B30B 15/14 (2006.01)
H02P 3/14 (2006.01)
H02P 27/00 (2006.01)

(52) U.S. Cl. ........ 100/48; 100/280; 318/376; 318/400.3

(58) Field of Classification Search ............ 100/48, 100/214, 271, 280; 318/376, 400.3; 363/40, 363/41, 71
See application file for complete search history.

(56) References Cited

U.S. PATENT DOCUMENTS

| | | | | |
|---|---|---|---|---|
| 2002/0096060 | A1* | 7/2002 | Kohno | ............................ 100/35 |
| 2003/0085621 | A1* | 5/2003 | Potega | ............................ 307/18 |
| 2006/0114702 | A1* | 6/2006 | Yamada et al. | ............... 363/132 |
| 2008/0238108 | A1* | 10/2008 | Edelson et al. | ............. 290/40 C |

FOREIGN PATENT DOCUMENTS

| | | |
|---|---|---|
| EP | 0 155 744 A2 | 9/1985 |
| EP | 1 484 831 A2 | 12/2004 |
| EP | 1 626 491 A2 | 2/2006 |
| EP | 1 658 911 A1 | 5/2006 |
| JP | 2000-236679 A | 8/2000 |
| JP | 2004-344946 A | 12/2004 |
| JP | 2005-204391 A | 7/2005 |
| JP | 2007-331023 A | 12/2007 |

* cited by examiner

*Primary Examiner* — Jimmy T Nguyen
(74) *Attorney, Agent, or Firm* — McDermott Will & Emery LLP

(57) ABSTRACT

A motor drive control device includes a power-running operation start voltage setting section that sets a power-running operation start voltage of the power supply converter, a power-running operation start control section that causes the power supply converter to start a power-running operation when the direct-current voltage of the power supply converter has reached the power-running operation start voltage set by the power-running operation start voltage setting section, a power-running operation stop voltage setting section that sets a power-running operation stop voltage of the power supply converter, and a power-running operation stop control section that causes the power supply converter to stop the power-running operation when the direct-current voltage of the power supply converter has reached the power-running operation stop voltage set by the power-running operation stop voltage setting section.

16 Claims, 11 Drawing Sheets

MOTOR DRIVE CONTROL DEVICE

Japanese Patent Application No. 2009-21369, filed on Feb. 2, 2009, is hereby incorporated by reference in its entirety.

BACKGROUND OF THE INVENTION

The present invention relates to a motor drive control device that includes a power supply converter that is connected to an alternating-current power supply, an inverter that is connected to a motor, and an energy storage device that is connected to a direct-current bus that connects the power supply converter and the inverter.

A motor drive control device that includes a power supply converter connected to an alternating-current power supply and an inverter connected to a motor has been widely known and used as a device that drives a motor (i.e., power source) used for many industrial machines. An industrial machine is not necessarily operated so that the load or the rotational speed is constant (i.e., the load or the rotational speed may vary to a large extent). Moreover, one process (or one processing cycle) may include one or more constant load periods or load change periods.

Therefore, a device in which an energy storage device is provided in a direct-current circuit between the power supply converter and the inverter to reduce a change in power supplied from the alternating-current power supply with respect to a change in power required for the motor has been proposed (JP-A-2000-236679). A device that allows a change in direct-current voltage due to a change in load during acceleration or deceleration of the motor by causing the power supply converter to increase the direct-current voltage before acceleration and causing the power supply converter to decrease the direct-current voltage before deceleration, has also been proposed (JP-A-2005-204391).

According to these devices, since the storage state of the energy storage device and the power-running/regeneration state with respect to the alternating-current power supply can be adjusted by controlling the direct-current voltage, the alternating-current peak value and the size of the alternating-current power supply can be reduced.

The above devices are designed on the assumption that the power supply converter always operates. This aims at dealing with a situation in which the load and the rotational speed of the industrial machine and the operational state of the motor vary to a large extent, and improving adaptability and generality.

When the power supply converter always operates, the thermal rating of the power supply converter must be determined taking account of such an operational state. Therefore, the size of a cooling fin or the like must be increased. Moreover, a loss occurs due to such an operational state.

The motor drive control device is not sufficiently improved by merely providing the energy storage device to reduce the size of the alternating-current power supply and reduce cost. Specifically, it is important to reduce the size of the power supply converter in order to improve the entire motor drive control device (i.e., industrial machine).

SUMMARY

According to a first aspect of the invention, there is provided a motor drive control device including a power supply converter that is connected to an alternating-current power supply, a voltage detector that detects a direct-current voltage of the power supply converter, an inverter that is connected to a motor, and an energy storage device that is connected to a direct-current bus that connects the power supply converter and the inverter, the motor drive control device including:

a power-running operation start voltage setting section that sets a power-running operation start voltage of the power supply converter;

a power-running operation start control section that causes the power supply converter to start a power-running operation when the direct-current voltage of the power supply converter has reached the power-running operation start voltage set by the power-running operation start voltage setting section;

a power-running operation stop voltage setting section that sets a power-running operation stop voltage of the power supply converter; and a power-running operation stop control section that causes the power supply converter to stop the power-running operation when the direct-current voltage of the power supply converter has reached the power-running operation stop voltage set by the power-running operation stop voltage setting section.

According to a second aspect of the invention, there is provided a motor drive control device including a power supply converter that is connected to an alternating-current power supply, a voltage detector that detects a direct-current voltage of the power supply converter, an inverter that is connected to a motor, and an energy storage device that is connected to a direct-current bus that connects the power supply converter and the inverter, the motor drive control device including:

a power-running operation voltage setting section that sets a power-running operation voltage of the power supply converter;

a power-running operation start control section that causes the power supply converter to start a power-running operation when the direct-current voltage of the power supply converter is equal to or lower than the power-running operation voltage set by the power-running operation voltage setting section;

a power-running operation stop control section that causes the power supply converter to stop the power-running operation when the direct-current voltage of the power supply converter has exceeded the power-running operation voltage set by the power-running operation voltage setting section;

a regenerative operation voltage setting section that sets a regenerative operation voltage of the power supply converter;

a regenerative operation start control section that causes the power supply converter to start a regenerative operation when the direct-current voltage of the power supply converter is equal to or higher than the regenerative operation voltage set by the regenerative operation voltage setting section; and a regenerative operation stop control section that causes the power supply converter to stop the regenerative operation when the direct-current voltage of the power supply converter is lower than the regenerative operation voltage set by the regenerative operation voltage setting section.

According to a third aspect of the invention, there is provided a motor drive control device including a power supply converter that is connected to an alternating-current power supply, a voltage detector that detects a direct-current voltage of the power supply converter, an inverter that is connected to a motor, and an energy storage device that is connected to a direct-current bus that connects the power supply converter and the inverter, the motor drive control device including:

a power-running operation start voltage setting section that sets a power-running operation start voltage of the power supply converter;

a power-running operation start control section that causes the power supply converter to start a power-running operation when the direct-current voltage of the power supply converter has reached the power-running operation start voltage set by the power-running operation start voltage setting section;

a power-running operation stop voltage setting section that sets a power-running operation stop voltage of the power supply converter;

a power-running operation stop control section that causes the power supply converter to stop the power-running operation when the direct-current voltage of the power supply converter has reached the power-running operation stop voltage set by the power-running operation stop voltage setting section;

a regenerative operation start voltage setting section that sets a regenerative operation start voltage of the power supply converter;

a regenerative operation start control section that causes the power supply converter to start a regenerative operation when the direct-current voltage of the power supply converter has reached the regenerative operation start voltage set by the regenerative operation start voltage setting section;

a regenerative operation stop voltage setting section that sets a regenerative operation stop voltage of the power supply converter; and a regenerative operation stop control section that causes the power supply converter to stop the regenerative operation when the direct-current voltage of the power supply converter has reached the regenerative operation stop voltage set by the regenerative operation stop voltage setting section.

DETAILED DESCRIPTION OF THE EMBODIMENT

Figure 1:
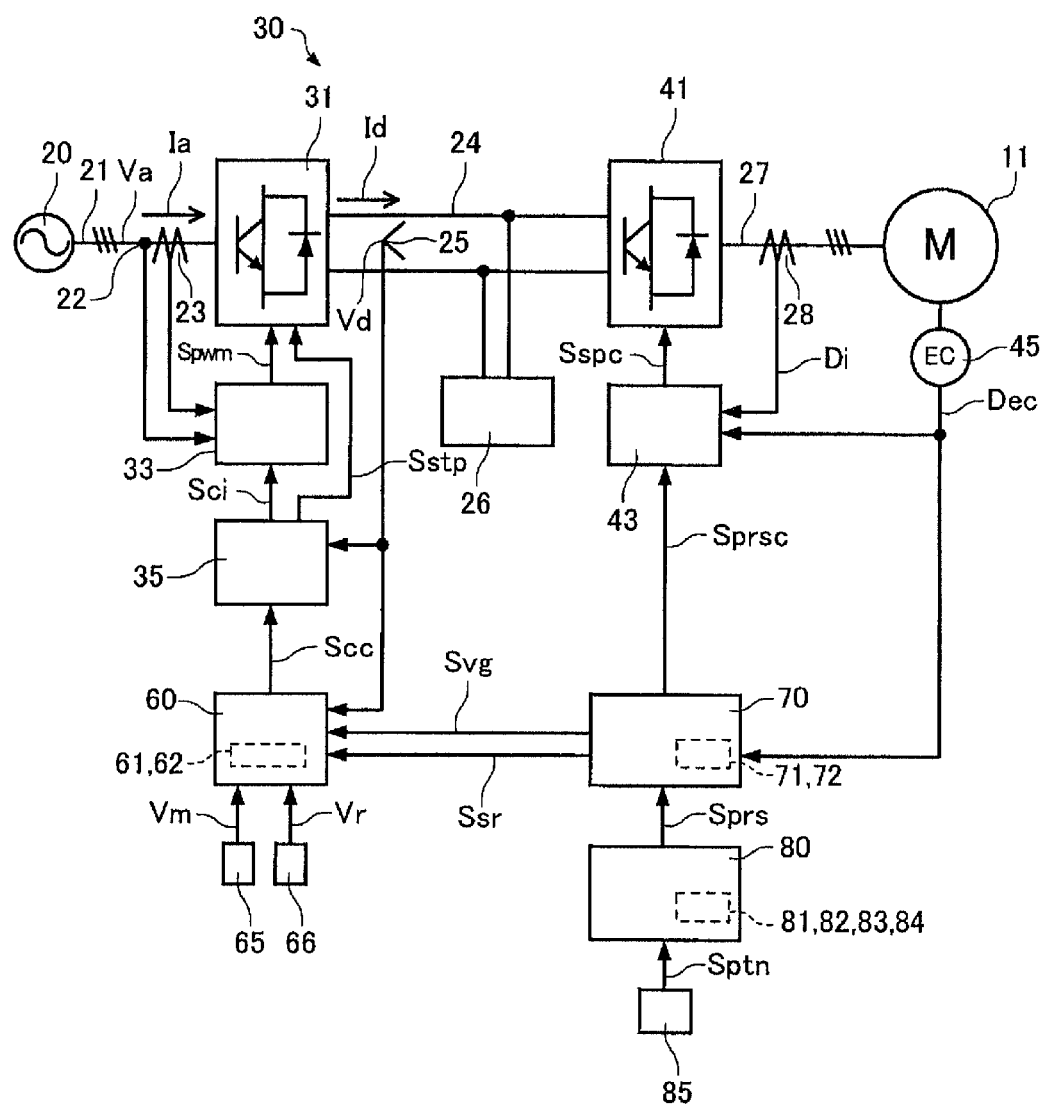
FIG. 1 is a circuit diagram illustrating a motor drive control device according to an embodiment of the invention.

The invention may provide a motor drive control device that enables a reduction in size of a power supply converter. The invention may also provide a motor drive control device that enables effective utilization of an energy storage device.

The invention may further provide a motor drive control device that enables a reduction in size of a power supply converter and effective utilization of an energy storage device at the same time.

The motor drive control device according to the invention has a direct-current voltage interval in which the power supply converter is not operated so that dependence on the power transferred to and from the energy storage device increases when recovering the energy consumed by the motor during the motor-running operation from the energy storage device and/or storing the energy generated during the regenerative operation in the energy storage device. Specifically, the power supply converter operates only when the operation voltage has been reached.

According to one embodiment of the invention, there is provided a motor drive control device including a power supply converter that is connected to an alternating-current power supply, a voltage detector that detects a direct-current voltage of the power supply converter, an inverter that is connected to a motor, and an energy storage device that is connected to a direct-current bus that connects the power supply converter and the inverter, the motor drive control device having:

a power-running operation start voltage setting section that sets a power-running operation start voltage of the power supply converter;

a power-running operation start control section that causes the power supply converter to start a power-running operation when the direct-current voltage of the power supply converter has reached the power-running operation start voltage set by the power-running operation start voltage setting section;

a power-running operation stop voltage setting section that sets a power-running operation stop voltage of the power supply converter; and a power-running operation stop control section that causes the power supply converter to stop the power-running operation when the direct-current voltage of the power supply converter has reached the power-running operation stop voltage set by the power-running operation stop voltage setting section.

According to the above motor drive control device, the size of the power supply converter can be reduced while improving efficiency.

The above motor drive control device may further include:

a current reference setting section that sets a current reference;

a current determination section that compares a detected load current of the power supply converter with the current reference set by the current reference setting section to determine whether or not the detected load current is smaller than the current reference; and a compulsory operation stop control section that compulsorily stops the operation of the power supply converter when the current determination section has determined that the detected load current is smaller than the current reference.

According to the above motor drive control device, since the operation of the power supply converter can be finely started and stopped, the efficiency of the power supply converter can be further improved.

According to one embodiment of the invention, there is provided a motor drive control device including a power supply converter that is connected to an alternating-current power supply, a voltage detector that detects a direct-current voltage of the power supply converter, an inverter that is connected to a motor, and an energy storage device that is connected to a direct-current bus that connects the power supply converter and the inverter, the motor drive control device having:

a power-running operation voltage setting section that sets a power-running operation voltage of the power supply converter;

a power-running operation start control section that causes the power supply converter to start a power-running operation when the direct-current voltage of the power supply converter is equal to or lower than the power-running operation voltage set by the power-running operation voltage setting section;

a power-running operation stop control section that causes the power supply converter to stop the power-running operation when the direct-current voltage of the power supply converter has exceeded the power-running operation voltage set by the power-running operation voltage setting section;

a regenerative operation voltage setting section that sets a regenerative operation voltage of the power supply converter;

a regenerative operation start control section that causes the power supply converter to start a regenerative operation when the direct-current voltage of the power supply converter is equal to or higher than the regenerative operation voltage set by the regenerative operation voltage setting section; and a regenerative operation stop control section that causes the power supply converter to stop the regenerative operation when the direct-current voltage of the power supply converter is lower than the regenerative operation voltage set by the regenerative operation voltage setting section.

According to the above motor drive control device, the size of the power supply converter can be reduced while improving efficiency. Moreover, the capacity of the energy storage device can be optimized.

The above motor drive control device may further include:

at least one of a power-running operation voltage setting change control section that changes the power-running operation voltage depending on the operational state of the motor and a regenerative operation voltage setting change control section that changes the regenerative operation voltage depending on the operational state of the motor.

According to the above motor drive control device, the size of the power supply converter can be further reduced while further improving efficiency and further optimizing the capacity of the energy storage device.

The above motor drive control device may further have:

a current reference setting section that sets a current reference;

a current determination section that compares a detected load current of the power supply converter with the current reference set by the current reference setting section to determine whether or not the detected load current is smaller than the current reference; and a compulsory operation stop control section that compulsorily stops the operation of the power supply converter when the current determination section has determined that the detected load current is smaller than the current reference.

According to the above motor drive control device, since the operation of the power supply converter can be finely started and stopped, the efficiency of the power supply converter can be further improved.

In the above motor drive control device, the value of the current reference may be changed corresponding to the operational state of the motor.

According to the above motor drive control device, the efficiency of the power supply converter can be improved so that adaptability increases.

According to one embodiment of the invention, there is provided a motor drive control device including a power supply converter that is connected to an alternating-current power supply, a voltage detector that detects a direct-current voltage of the power supply converter, an inverter that is connected to a motor, and an energy storage device that is connected to a direct-current bus that connects the power supply converter and the inverter, the motor drive control device including:

a power-running operation start voltage setting section that sets a power-running operation start voltage of the power supply converter;

a power-running operation start control section that causes the power supply converter to start a power-running operation when the direct-current voltage of the power supply converter has reached the power-running operation start voltage set by the power-running operation start voltage setting section;

a power-running operation stop voltage setting section that sets a power-running operation stop voltage of the power supply converter;

a power-running operation stop control section that causes the power supply converter to stop the power-running operation when the direct-current voltage of the power supply converter has reached the power-running operation stop voltage set by the power-running operation stop voltage setting section;

a regenerative operation start voltage setting section that sets a regenerative operation start voltage of the power supply converter;

a regenerative operation start control section that causes the power supply converter to start a regenerative operation when the direct-current voltage of the power supply converter has reached the regenerative operation start voltage set by the regenerative operation start voltage setting section;

a regenerative operation stop voltage setting section that sets a regenerative operation stop voltage of the power supply converter; and a regenerative operation stop control section that causes the power supply converter to stop the regenerative operation when the direct-current voltage of the power supply converter has reached the regenerative operation stop voltage set by the regenerative operation stop voltage setting section.

According to the above motor drive control device, fine operation control can be implemented so that the size of the power supply converter can be further reduced while further improving efficiency and further optimizing the capacity of the energy storage device.

The above motor drive control device may further have:

a power-running operation voltage setting change control section that changes at least one of the power-running operation start voltage and the power-running operation stop voltage depending on the operational state of the motor; and a regenerative operation voltage setting change control section that changes at least one of the regenerative operation start voltage and the regenerative operation stop voltage depending on the operational state of the motor.

According to the above motor drive control device, fine operation control can be implemented so that the size of the power supply converter can be further reduced while further improving efficiency and further optimizing the capacity of the energy storage device.

The above motor drive control device may further have:

a current reference setting section that sets a current reference;

a current determination section that compares a detected load current of the power supply converter with the current reference set by the current reference setting section to determine whether or not the detected load current is smaller than the current reference; and a compulsory operation stop control section that compulsorily stops the operation of the power supply converter when the current determination section has determined that the detected load current is smaller than the current reference.

According to the above motor drive control device, since the operation of the power supply converter can be finely started and stopped, the efficiency of the power supply converter can be further improved.

In the above motor drive control device, the value of the current reference may be changed corresponding to the operational state of the motor.

According to the above motor drive control device, the efficiency of the power supply converter can be improved so that adaptability increases.

The above motor drive control device may be a motor drive control device of a servo press machine that presses a workpiece in a processing area while moving a slide upward and downward by driving the motor.

According to the above motor drive control device, the size of the power supply converter of the servo press machine can be reduced while improving efficiency. Moreover, the capacity of the energy storage device can be optimized.

The above motor drive control device may be a motor drive control device of a servo press machine that presses a workpiece in a processing area while moving a slide upward and downward by driving the motor,
wherein the operational state of the motor is determined depending on a press pattern in a pressing process of the servo press machine.

According to the above motor drive control device, the size of the power supply converter of the servo press machine can be further reduced while further improving efficiency and further optimizing the capacity of the energy storage device.

The above motor drive control device may further include:
a current reference setting section that sets a current reference;
a current determination section that compares a detected load current of the power supply converter with the current reference set by the current reference setting section to determine whether or not the detected load current is smaller than the current reference; and
a compulsory operation stop control section that compulsorily stops the operation of the power supply converter when the current determination section has determined that the detected load current is smaller than the current reference.

According to the above motor drive control device, since the operation of the power supply converter of the servo press machine can be finely started and stopped, the efficiency of the power supply converter can be further improved.

In the above motor drive control device, the value of the current reference may be changed corresponding to the operational state of the servo press machine.

According to the above motor drive control device, the efficiency of the power supply converter of the servo press machine can be improved so that adaptability increases.

The above motor drive control device may be a motor drive control device of a servo press machine that presses a workpiece in a processing area while moving a slide upward and downward by driving the motor.

According to the above motor drive control device, fine operation control can be implemented so that the size of the power supply converter of the servo press machine can be further reduced while further improving efficiency and further optimizing the capacity of the energy storage device.

The above motor drive control device may be a motor drive control device of a servo press machine that presses a workpiece in a processing area while moving a slide upward and downward by driving the motor,
wherein the operational state of the motor is determined depending on a press pattern in a pressing process of the servo press machine.

According to the above motor drive control device, fine operation control can be implemented so that the size of the power supply converter of the servo press machine can be further reduced while further improving efficiency and further optimizing the capacity of the energy storage device.

The motor drive control device may further have:
a current reference setting section that sets a current reference;
a current determination section that compares a detected load current of the power supply converter with the current reference set by the current reference setting section to determine whether or not the detected load current is smaller than the current reference; and
a compulsory operation stop control section that compulsorily stops the operation of the power supply converter when the current determination section has determined that the detected load current is smaller than the current reference.

According to the above motor drive control device, since the operation of the power supply converter of the servo press machine can be finely started and stopped, the efficiency of the power supply converter can be further improved.

In the motor drive control device, the value of the current reference may be changed corresponding to the operational state of the servo press machine.

According to the above motor drive control device, the efficiency of the power supply converter of the servo press machine can be improved so that adaptability increases.

Embodiments of the invention are described in detail below with reference to the drawings.

As shown in FIGS. 1 to 4, a motor drive control device 30 according to one embodiment of the invention includes an energy storage device 26 that is connected to a direct-current bus 24 that connects a power supply converter 31 and an inverter 41, and can control a servomotor (hereinafter abbreviated as "motor") 11, the motor drive control device 30 further including a power-running operation voltage setting section 65, and a voltage setting operation control section 60 configured to perform functions as a power-running operation start control section and a power-running operation stop control section, so that the power-running operation of the power supply converter 31 can be started when a direct-current voltage Vd is equal to or lower than a power-running operation voltage Vm, and can be stopped when the direct-current voltage Vd has exceeded the power-running operation voltage Vm.

The voltage setting operation control section 60 shown in FIG. 1 includes a calculation section 61 and a memory section 62 which function as the power-running operation start control section (mentioned above), the power-running operation stop control section (mentioned above), a regenerative operation start control section (discussed below), a regenerative operation stop control section (discussed below), an operation voltage determination section (discussed below), an operation control section (discussed below), and a direct-current voltage reading section (discussed below).

The motor drive control device 30 according to this embodiment also includes a regenerative operation voltage setting section 66 together with the regenerative operation start control section and the regenerative operation stop control section implemented by the calculation section 61 and the memory section 62 so that the regenerative operation of the power supply converter 31 can be started when the direct-current voltage Vd is equal to or higher than a regenerative operation voltage Vr, and can be stopped when the direct-current voltage Vd is lower than the regenerative operation voltage Vr.

In this embodiment, the power-running operation can be started and stopped based on the power-running operation voltage Vm, and the regenerative operation can be started and stopped based on the regenerative operation voltage Vr.

The following description is given taking an example in which the motor drive control device 30 controls the motor 11 of a servo press machine 10 for which a change in load is relatively large. The servo press machine 10 is an industrial machine that drives a slide drive mechanism using the motor 11, and presses a workpiece in a processing area while moving a slide 16 upward and downward.

Figure 2:
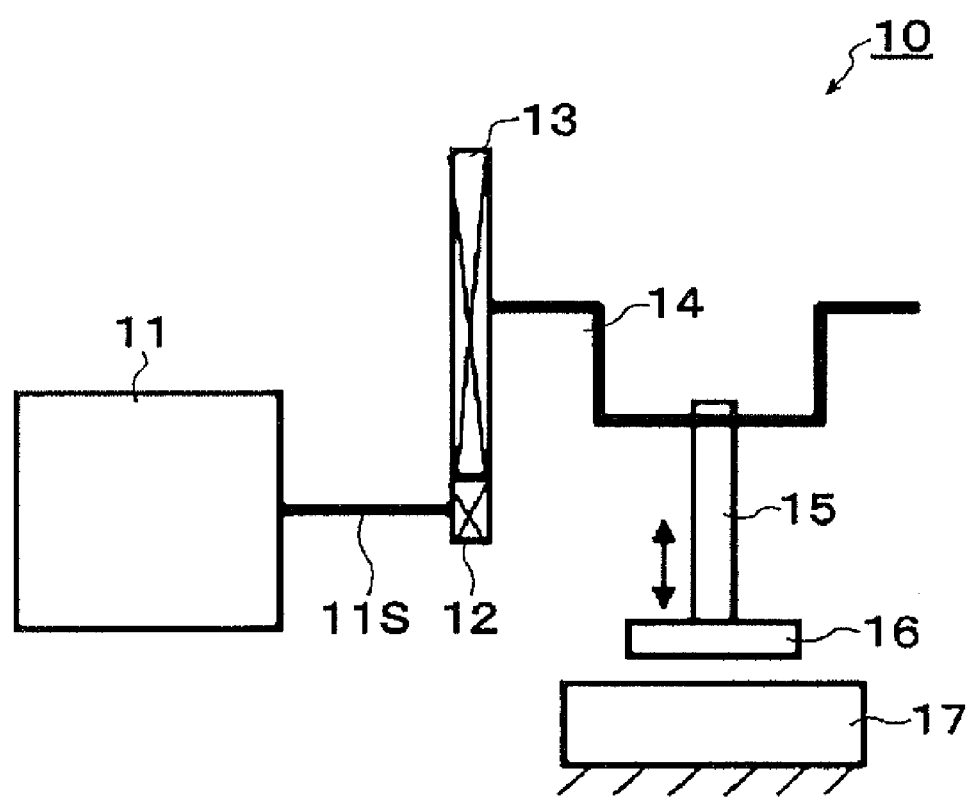
FIG. 2 is a schematic diagram illustrating a servo press machine that utilizes the motor drive control device according to the above embodiment of the invention.

In FIG. 2 that schematically shows the configuration of the servo press machine 10, a main gear 13 engages a gear 12 that is connected to a motor shaft 11S of the motor 11, and a crank shaft 14 of the slide drive mechanism (crank mechanism) and a connecting rod 15 are connected to the main gear 13. A workpiece can be pressed in the processing area while moving the slide 16 upward and downward with respect to a stationary bolster 17 by driving the motor 11. Since the crank shaft 14 is arbitrarily rotated by forward rotation, reverse rotation, and variable speed control of the motor 11, various slide motions (i.e., the operational state of the motor) can be arbitrarily set (i.e., can be combined or switched). This improves the accuracy and the productivity of the pressed products so that adaptability with regard to the press form increases.

The rotational speed (rotational position) of the motor 11 is detected by an encoder 45 shown in FIG. 1, and input to a speed control section 43 and a press drive control section 70 as a signal Dec. Note that a position control section (43) may be used instead of the speed control section.

The motor 11 may be a synchronous motor utilizing a permanent magnet, an induction motor, a reluctance motor, or the like. In this embodiment, the AC servomotor (motor 11) is a synchronous motor. A DC servomotor may be used instead of the AC servomotor. The slide drive mechanism may be a mechanism (e.g., link mechanism, ball-thread mechanism, or direct-acting mechanism) other than the crank mechanism.

In FIG. 1, the motor drive control device 30 that controls the motor 11 includes the power supply converter 31 connected to an alternating-current power supply 20, and the inverter 41 connected to the motor. Reference numeral 21 indicates an alternating-current power supply path, and reference numeral 27 indicates a driving-side alternating-current power supply path. A voltage detector 22 and a current detector 23 are provided in the alternating-current power supply path 21, and the energy storage device 26 is connected to the direct-current bus (direct-current power supply path) 24 that connects the power supply converter 31 and the inverter 41. A current detector 28 is provided in the alternating-current power supply path 27. The alternating-current power supply is indicated by reference numeral 20. A reactor (not shown) is provided on the side of the alternating-current power supply 20 taking account of the operation of the power supply converter 31 (also omitted in FIG. 9).

The power supply converter 31 can perform a regenerative operation. Note that the power supply converter 31 may perform only a power-running operation when the regenerative operation start control section, the regenerative operation stop control section, and a regenerative operation voltage setting change control section (discussed below) are not provided.

A current control section 33 utilizes a current control signal Sci input from a voltage control section 35 as a target value, and utilizes the value of an alternating current Ia detected by the current detector 23 as a feedback signal. The current control section 33 generates and outputs a PWM control signal Spwm referring to the value of an alternating-current voltage Va detected by the voltage detector 22. The power supply converter 31 controls current based on the PWM control signal Spwm. Note that the power supply converter 31 stops the operation (power-running operation or regenerative operation) when an operation stop signal Sstp (e.g., Low level) has been input to the power supply converter 31.

Specifically, since the direct current Id of the power supply converter 31 is proportional to the alternating current Ia, the current control section 33 controls the power supply converter 31 so that the alternating current Ia from the alternating-current power supply (20) is proportional to the current control signal Sci output from the voltage control section 35. The voltage Va of the alternating-current power supply (20) is also detected so that the current Ia from the alternating-current power supply (20) is synchronized with the voltage phase. According to this configuration, the power supply current (Ia) can be controlled to be a sine wave while achieving a unity power factor. The current instruction value (Sci) supplied to the current control section 33 may be set so that the power factor is other than one by utilizing reactive component control in combination. The current value may be detected from the motor side (24) of the power supply converter 31.

The voltage control section 35 operates so that the direct-current voltage Vd of the power supply converter 31 coincides with a given value, and controls the energy storage operation of the energy storage device 26 and the power transfer operation of the power supply converter 31 depending on the power required for the power-running operation or the regenerative operation of the inverter 41. Specifically, the voltage control section 35 generates and outputs the current control signal Sci based on an operation control signal Scc (i.e., target value) input from the voltage setting operation control section 60 and the value of the direct-current voltage Vd (i.e., feedback signal) detected by a voltage detector 25.

The current control signal Sci is a signal that corresponds to the output current (Id) of the power supply converter 31. The current control signal Sci corresponds to the alternating current Ia when the power factor of the alternating-current power supply (20) is one. The voltage control section 35 also outputs a signal Sstp that indicates whether or not to cause the power supply converter 31 to perform or stop operation (power-running operation or regenerative operation) depending on the direct-current voltage Vd. The signal Sstp serves as an operation stop signal (Sstp) when the signal Sstp is set at the Low level. The signal Sstp allows the power supply converter 31 to operate when the signal Sstp is set at the High level.

The speed control section 43 can perform speed control, current control, and PWM control of the motor 11. The speed control section 43 drives the motor 11 during a normal press operation (i.e., the normal operation of the motor 11) while controlling current by PWM control based on speed control. Specifically, the speed control section 43 generates the speed control signal Sspc based on a press speed control instruction signal Sprsc from the press drive control section 70, the detection signal Dec (i.e., feedback signal) from the encoder 45, and a detection signal Di (i.e., feedback signal) from the current detector 28, and outputs the speed control signal Sspc to the inverter 41. The inverter 41 controls the current supplied to the motor 11 by PWM control based on the speed control signal Sspc. The inverter 41 outputs a variable-frequency, variable-voltage three-phase alternating-current voltage to the motor 11, and the motor 11 operates (rotates) based on the alternating-current voltage. Note that the current supplied to the motor 11 can also be controlled using a position control section that has a speed control section in a minor loop instead of the speed control section 43. In this case, it is desirable that the instruction from the press drive control section 70 be an instruction that indicates the position of the slide 16 of the press 10 or an instruction that indicates the angle of the crank shaft 14.

Figure 4:
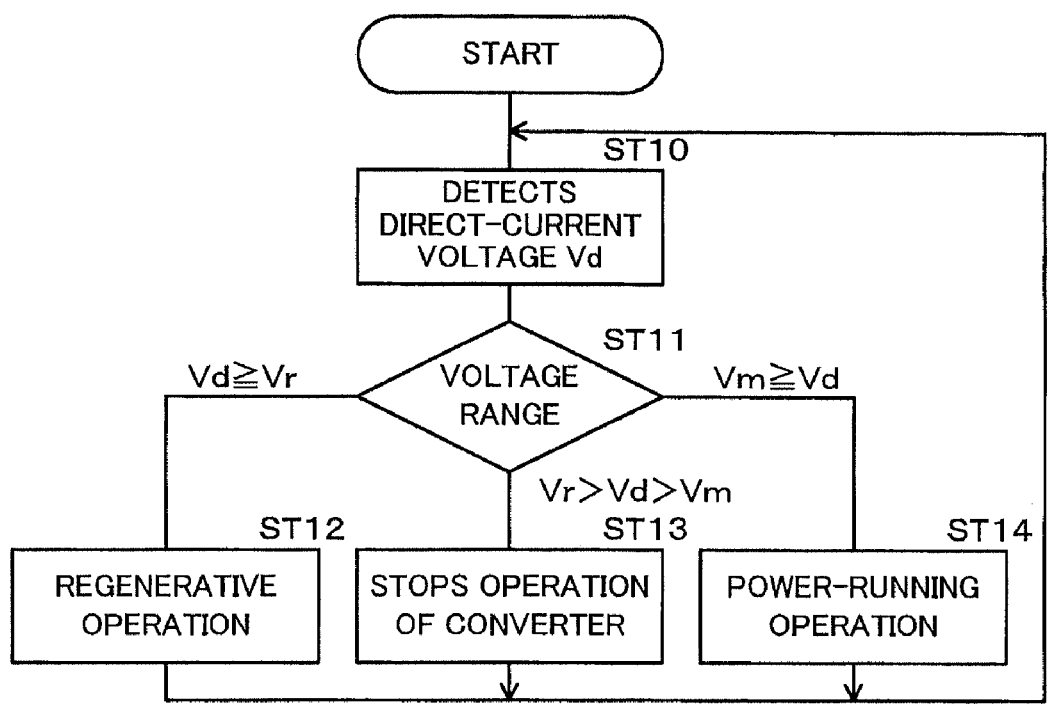
FIG. 4 is a flowchart illustrating a basic control operation according to the above embodiment of the invention.

The press drive control section 70 includes a calculation section 71, a memory section 72, an operation section (not shown), a display section (not shown), an interface (not shown), and the like, and stores a selected press pattern (i.e., motor operation pattern) transmitted from an operation instruction control section 80 in the memory section 72. The press drive control section 70 generates the press speed control instruction signal Sprsc that controls the motor 11 based on the selected press pattern stored in the memory section 72, and outputs the press speed control instruction signal Sprsc. The press drive control section 70 also generates an operation instruction signal Ssr, and outputs the operation instruction signal Ssr to the voltage setting operation control section 60. An operation control program shown in FIG. 4 is executed based on the operation instruction signal Ssr. The details are described later.

The operation instruction control section 80 includes a calculation section 81, a memory section 82, an operation section 83, a display section 84, an interface (not shown), and the like. When the motor operation pattern (i.e., slide motion (press pattern of the pressing process)) has been set using a pattern setting selection section 85, the operation instruction control section 80 stores the press pattern in the memory section 82. When an arbitrary press pattern has been selected using the pattern setting selection section 85, the operation instruction control section 80 extracts the press pattern from a plurality of press patterns stored in the memory section 82, and outputs the extracted press pattern to the press drive control section 70 as part of a press operation control instruction signal Sprs.

The operation instruction control section 80 includes specification determination output sections 81, 82, and 84. The specification determination output sections 81, 82, and 84 include a memory section 82 that stores a specification determination output control program, a calculation section 81 that executes the specification determination output control program, and a display section 84 that displays the determined specification. The specification determination output control program is formulated so that the specification can be calculated (or simulated) and output to the voltage setting operation control section 60 based on the conversion capacity of the power supply converter 31 input using the operation section 83, the storage capacity of the energy storage device 26, and the press pattern set (or selected) using the pattern setting selection section 85. The specification determination output sections 81, 82, and 84 may be formed in the press drive control section 70.

The specification refers to the power-running operation voltage Vm, the regenerative operation voltage Vr, and voltage setting change timing information. Since the specification is displayed on the display section 84, it is possible to quantitatively determine the specification. The power-running operation voltage Vm can be set using the power-running operation voltage setting section 65 shown in FIG. 1, and the regenerative operation voltage Vr can be set using the regenerative operation voltage setting section 66. Therefore, the operator can quickly and accurately set the specification.

Note that the specification may be automatically transmitted and set in the voltage setting operation control section 60 (memory section 62). The specification determination output sections 81, 82, and 84 may be formed in the voltage setting operation control section 60 taking account of workability.

The specification used in another embodiment includes a power-running operation start voltage Vms, a power-running operation stop voltage Vmr, a regenerative operation start voltage Vrs, and regenerative operation stop voltage Vrr. The specification also includes voltage setting change timing information. In a further embodiment, the specification also includes a current reference Ia.

The energy storage device 26 may be a secondary battery, a large-capacity electrolytic capacitor, an electric double-layer capacitor, or the like. The energy storage device 26 may be a combination of these devices. In this embodiment, the energy storage device 26 is directly connected to the direct-current bus 24. When the energy storage device 26 and the direct-current bus 24 differ in voltage, the energy storage device 26 may be connected to the direct-current bus 24 via a bidirectional DC/DC converter. Note that the energy storage device 26 may be formed using a flywheel system.

The energy storage device 26 discharges (supplies) the stored power energy to the motor 11 when the motor 11 requires a large amount of power during acceleration, press operation, or the like. The capacity of the power supply converter 31 and the alternating-current power supply 20 can be reduced while improving the system efficiency by charging and discharging power using the energy storage device 26.

The voltage setting operation control section 60 shown in FIG. 1 includes the calculation section 61, the memory section 62, an operation section (not shown), a display section (not shown), an interface (not shown), and the like, and has a voltage setting function, a voltage setting change function, and an operation control function.

The voltage setting function refers to storing the power-running operation voltage Vm set using the power-running operation voltage setting section 65 and the regenerative operation voltage Vr set using the regenerative operation voltage setting section 66 in a storage area of the memory section 62. The voltage setting operation control section 60 may set and store a plurality of power-running operation voltages Vm and a plurality of regenerative operation voltages Vr.

The voltage setting operation control section 60 extracts the power-running operation voltage Vm and the regenerative operation voltage Vr corresponding to the operation instruction signal Ssr (including a signal that specifies the power-running operation voltage Vm and a signal that specifies the regenerative operation voltage Vr) input from the press drive control section 70 from a plurality of power-running operation voltages Vm and a plurality of regenerative operation voltages Vr stored in the memory section 62, and stores the extracted power-running operation voltage Vm and the extracted regenerative operation voltage Vr in a work area of the memory section 62. The voltage setting change function is described later with reference to a power-running operation voltage setting change control section and the regenerative operation voltage setting change control section. These sections are implemented by the calculation sections 61 and 71, and the memories 62 and 72.

The operation control function refers to generating the operation control signal Scc (including power-running operation start control signal Scms, power-running operation stop control signal Scmr, regenerative operation start control signal Scrs, and regenerative operation stop control signal Scrr) corresponding to the power-running operation voltage Vm and/or the regenerative operation voltage Vr specified by the operation instruction signal Ssr, and outputting the operation control signal Scc to the voltage control section 35.

The power-running operation start control section and the power-running operation stop control section (i.e., the features of this embodiment) are described below. The power-running operation voltage setting change control section is also described below.

The power-running operation start control section causes the power supply converter 31 to start the power-running operation when the direct-current voltage Vd of the power supply converter 31 is equal to or lower than the power-running operation voltage Vm set using the power-running operation voltage setting section 65. In this embodiment, the power-running operation start control section includes the memory section 62 that is provided in the voltage setting operation control section 60 and stores a power-running operation start control signal generation output control program, and the calculation section 61 that is provided in the voltage setting operation control section 60 and executes the power-running operation start control signal generation output control program when the direct-current voltage Vd of the power supply converter 31 is equal to or lower than the power-running operation voltage Vm to generate and output the power-running operation start control signal Scms (part of the operation control signal Scc). The power-running operation start control section is activated in a step ST14 shown in FIG. 4.

The operation voltage determination section determines (ST11) whether or not the direct-current voltage Vd that has been detected (ST10) is equal to or lower than the power-running operation voltage Vm. Note that the operation voltage determination section may determine whether or not the direct-current voltage Vd is equal to or lower than the power-running operation voltage Vm while providing a small hysteresis. This also applies to determination of the regenerative operation voltage Vr.

The power-running operation stop control section causes the power supply converter 31 to stop the power-running operation when the direct-current voltage Vd has exceeded the power-running operation voltage Vm. The power-running operation stop control section includes the memory section 62 that is provided in the voltage setting operation control section 60 and stores a power-running operation stop control signal generation output control program, and the calculation section 61 that is provided in the voltage setting operation control section 60 and executes the power-running operation stop control signal generation output control program when the detected direct-current voltage Vd has exceeded the power-running operation voltage Vm to generate and output the power-running operation stop control signal Scmr (part of the operation control signal Scc). The power-running operation stop control section is activated in a step ST13 shown in FIG. 4. The operation voltage determination section determines (ST11) whether or not the direct-current voltage Vd has exceeded the power-running operation voltage Vm.

The power-running operation voltage setting change control section changes the power-running operation voltage Vm depending on the operation of the motor (i.e., the press pattern of the pressing process), and include the memory section 72 that is provided in the press drive control section 70 and stores a power-running operation voltage change instruction signal generation output control program, the calculation section 71 that executes the power-running operation voltage change instruction signal generation output control program and generates/outputs a power-running operation voltage setting change instruction signal Svgm (part of the voltage setting change instruction signal Svg), the memory section 62 that stores a power-running operation voltage setting change control program, and the calculation section 61 that executes the power-running operation voltage setting change control program and changes the power-running operation voltage Vm to a value corresponding to the power-running operation voltage setting change instruction signal Svgm.

Specifically, the power-running operation voltage (e.g., Vmh) stored in the work area of the memory section 62 is changed by selecting a new power-running operation voltage (e.g., Vml) corresponding to the selected pressing process (press pattern) from a plurality of power-running operation voltages Vm stored in the storage area of the memory section 62, and rewriting the power-running operation voltage (Vmh) in the work area with the new power-running operation voltage (Vml). When changing the power-running operation voltage Vm, the change timing is also rewritten with a new change timing specified by the power-running operation voltage setting change instruction signal Svgm. In Example 1 shown in FIG. 5, the power-running operation voltage Vm is not changed.

In this embodiment, the voltage setting operation control section 60 is provided separately from the press drive control section 70 taking account of the signal (Dec, Vd, Scc) processing efficiency, consistency with the power supply converter 31, and the like. Note that the voltage setting operation control section 60 may be integrated in the press drive control section 70. Most of the processes of the regenerative operation start control section, the regenerative operation stop control section, the regenerative operation voltage setting change control section, and the like are implemented by software resources. Note that part or the entirety of the processes may be implemented by a hardware logic. This also applies to the following description.

The regenerative operation start control section and the regenerative operation stop control section (i.e., the features of this embodiment) are described below. The regenerative operation voltage setting change control section is also described below.

The regenerative operation start control section causes the power supply converter 31 to start the regenerative operation when the direct-current voltage Vd of the power supply converter 31 is equal to or higher than the regenerative operation voltage Vr set using the regenerative operation voltage setting section 66. In this embodiment, the regenerative operation start control section includes the memory section 62 that is provided in the voltage setting operation control section 60 and stores a regenerative operation start control signal generation output control program, and the calculation section 61 that executes the regenerative operation start control signal generation output control program when the direct-current voltage Vd of the power supply converter 31 is equal to or higher than the regenerative operation voltage Vr set using the regenerative operation voltage setting section 66 to generate and output the regenerative operation start control signal Scrs (part of the operation control signal Scc). The regenerative operation start control section is activated in a step ST12 shown in FIG. 4. The operation voltage determination section determines (ST11) whether or not the direct-current voltage Vd that has been detected (ST10) is equal to or higher than the regenerative operation voltage Vr.

The regenerative operation stop control section causes the power supply converter 31 to stop the regenerative operation when the direct-current voltage Vd is lower than the regenerative operation voltage Vr. The regenerative operation stop control section includes the memory section 62 that stores a regenerative operation stop control signal generation output control program, and the calculation section 61 that executes the regenerative operation stop control signal generation output control program when the detected direct-current voltage Vd has exceeded the regenerative operation voltage Vr to generate and output the regenerative operation stop control signal Scrr (part of the operation control signal Scc). The regenerative operation stop control section is activated in the step ST13 shown in FIG. 4. The operation voltage determination section determines (ST11) whether or not the direct-current voltage Vd that has been detected (ST10) is lower than the regenerative operation voltage Vr.

The regenerative operation voltage setting change control section changes the regenerative operation voltage Vr depending on the operation of the motor (i.e., the press pattern of the pressing process), and include the memory section 72 that stores a regenerative operation voltage change instruction signal generation output control program, the calculation section 71 that executes the regenerative operation voltage change instruction signal generation output control program and generates/outputs a regenerative operation voltage setting change instruction signal Svgr (part of the voltage setting change instruction signal Svg), the memory section 62 that stores a regenerative operation voltage setting change control program, and the calculation section 61 that executes the regenerative operation voltage setting change control program and changes the regenerative operation voltage Vr to a value corresponding to the regenerative operation voltage setting change instruction signal Svgr.

Specifically, the regenerative operation voltage (e.g., Vrl) stored in the work area of the memory section 62 is changed by selecting a new regenerative operation voltage (e.g., Vrh) corresponding to the selected pressing process (press pattern) from a plurality of regenerative operation voltages Vr stored in the storage area of the memory section 62, and rewriting the regenerative operation voltage (Vrl) in the work area with the new power-running operation voltage (Vrh). When changing the regenerative operation voltage Vr, the change timing is also rewritten with a new change timing specified by the regenerative operation voltage setting change instruction signal Svgr. In Example 1 shown in FIG. 5, the regenerative operation voltage Vr is not changed.

According to the above configuration, the regenerative operation voltage Vr and the power-running operation voltage Vm are set based on the direct-current voltage Vd of the direct-current bus 24 as the target value. Specifically, the regenerative operation voltage Vr and the power-running operation voltage Vm are set so that Vr>Vm. The power supply converter 31 performs the regenerative operation that returns power from the inverter 41 to the alternating-current power supply (20) when the direct-current voltage Vd has risen to a value equal to or higher than the regenerative operation voltage Vr, and stops the regenerative operation when the direct-current voltage Vd has dropped to a value lower than the regenerative operation voltage Vr. The power supply converter 31 performs the power-running operation that supplies power to the inverter 41 from the alternating-current power supply (20) when the direct-current voltage Vd has dropped to a value equal to or lower than the power-running operation voltage Vm, and stops the power-running operation when the direct-current voltage Vd has exceeded the power-running operation voltage Vm. Whether to start or stop the operation may be determined while providing a small hysteresis to the voltage.

A case where the direct-current voltage Vd is lower than the regenerative operation voltage Vr and is higher than the power-running operation voltage Vm (time t31) is described in detail below with reference to FIG. 3.

The operation of the power supply converter 31 is stopped at the time t31. Since the regeneration energy from the motor 11 that performs the regenerative operation is stored in the energy storage device 26, the direct-current voltage Vd rises. When the direct-current voltage Vd has risen to a value equal to or higher than the regenerative operation voltage Vr at a time t32, the voltage setting operation control section 60 that forms the regenerative operation start control section outputs the operation control signal Scc (regenerative operation start control signal Scrs) to the voltage control section 35. The power supply converter 31 starts the regenerative operation based on the PWM control signal Spwm from the current control section 33. Specifically, the power supply converter 31 returns the regenerative power from the motor 11 to the alternating-current power supply (20).

The regenerative power from the motor 11 is almost equal to the regenerative power of the power supply converter 31 from the time t32 to a time t33 so that the direct-current voltage Vd is maintained at a constant value. The regenerative power from the motor 11 is larger than the regenerative power of the power supply converter 31 from the time t33 to a time t34 so that the direct-current voltage Vd rises. The regenerative power from the motor 11 is smaller than the regenerative power of the power supply converter 31 from the time t34 to a time t35 so that the direct-current voltage Vd drops.

Since the direct-current voltage Vd is equal to or higher than the regenerative operation voltage Vr from the time t32 to the time t35, the power supply converter 31 performs the regenerative operation. When the direct-current voltage Vd has dropped to a value lower than the regenerative operation voltage Vr at the time t35, the regenerative operation stop control section (voltage setting operation control section 60) outputs the operation control signal Scc (regenerative operation stop control signal Scrr) to the voltage control section 35. The voltage control section 35 then outputs the operation stop signal Sstp to the power supply converter 31 so that the power supply converter 31 stops the regenerative operation.

When the direct-current voltage Vd has dropped to a value equal to or lower than the power-running operation voltage Vm at a time t36, the power-running operation start control section (voltage setting operation control section 60) outputs the operation control signal Scc (power-running operation start control signal Scms) to the voltage control section 35. The power supply converter 31 starts the power-running operation based on the PWM control signal Spwm from the current control section 33. Specifically, the power supply converter 31 supplies the power from the alternating-current power supply (20) to the direct-current bus 24 on the side of the motor 11.

The press load (i.e., power required for the motor) is almost equal to the power supplied from the power supply converter 31 from the time t36 to a time t37 so that the direct-current voltage Vd is maintained at a constant value. The power required for the motor is larger than the power supplied from the power supply converter 31 from the time t37 to a time t38 so that the direct-current voltage Vd drops. The power required for the motor is smaller than the power supplied from the power supply converter 31 from the time t38 to a time t39 so that the direct-current voltage Vd rises.

As described above, the power supply converter 31 performs the power-running operation when the direct-current voltage Vd has dropped to a value equal to or lower than the power-running operation voltage Vm. When the direct-current voltage Vd has exceeded the power-running operation voltage Vm at the time t39, the power-running operation stop control section (voltage setting operation control section 60) outputs the operation control signal Scc (power-running operation stop control signal Scmr) to the voltage control section 35. The voltage control section 35 then outputs the operation stop signal Sstp to the power supply converter 31 so that the power supply converter 31 stops the power-running operation.

The operation control program (ST10 to ST14) shown in FIG. 4 is executed by the operation control section. The operation control section includes the memory section 62 that stores the operation control program, and the calculation section 61 that executes the operation control program. The operation control section is activated when the operation instruction signal Ssr has been received from the press drive control section 70.

In FIG. 4, a direct-current voltage reading section (61, 62) reads and detects the direct-current voltage Vd of the power supply converter 31 detected by the voltage detector 25 (ST10). The operation voltage determination section determines the range of the voltage (ST11). When the direct-current voltage Vd is equal to or higher than the regenerative operation voltage Vr (Vd≧Vr in ST11), the regenerative operation start control section operates and causes the power supply converter 31 to perform the regenerative operation so that the direct-current voltage Vd reaches the regenerative operation voltage Vr (target value) (ST12), and return to the step ST10.

When the direct-current voltage Vd has been determined to be lower than the regenerative operation voltage Vr and higher than the power-running operation voltage Vm (Vr>Vd>Vm in ST11), the regenerative operation stop control section operates and causes the power supply converter 31 to stop the regenerative operation (ST13), and return to the step ST10.

When the direct-current voltage Vd has been determined to be equal to or lower than the power-running operation voltage Vm (Vm≧Vd in ST11), the power-running operation start control section operates and causes the power supply converter 31 to perform the power-running operation so that the direct-current voltage Vd reaches the power-running operation voltage Vm (target value) (ST14), and return to the step ST10.

When the operation voltage determination section has determined that the direct-current voltage Vd is lower than the regenerative operation voltage Vr and is higher than the power-running operation voltage Vm (Vr>Vd>Vm in ST11), the power-running operation stop control section operates and causes the power supply converter 31 to stop the power-running operation (ST13), and return to the step ST10.

Example 1

Figure 5:
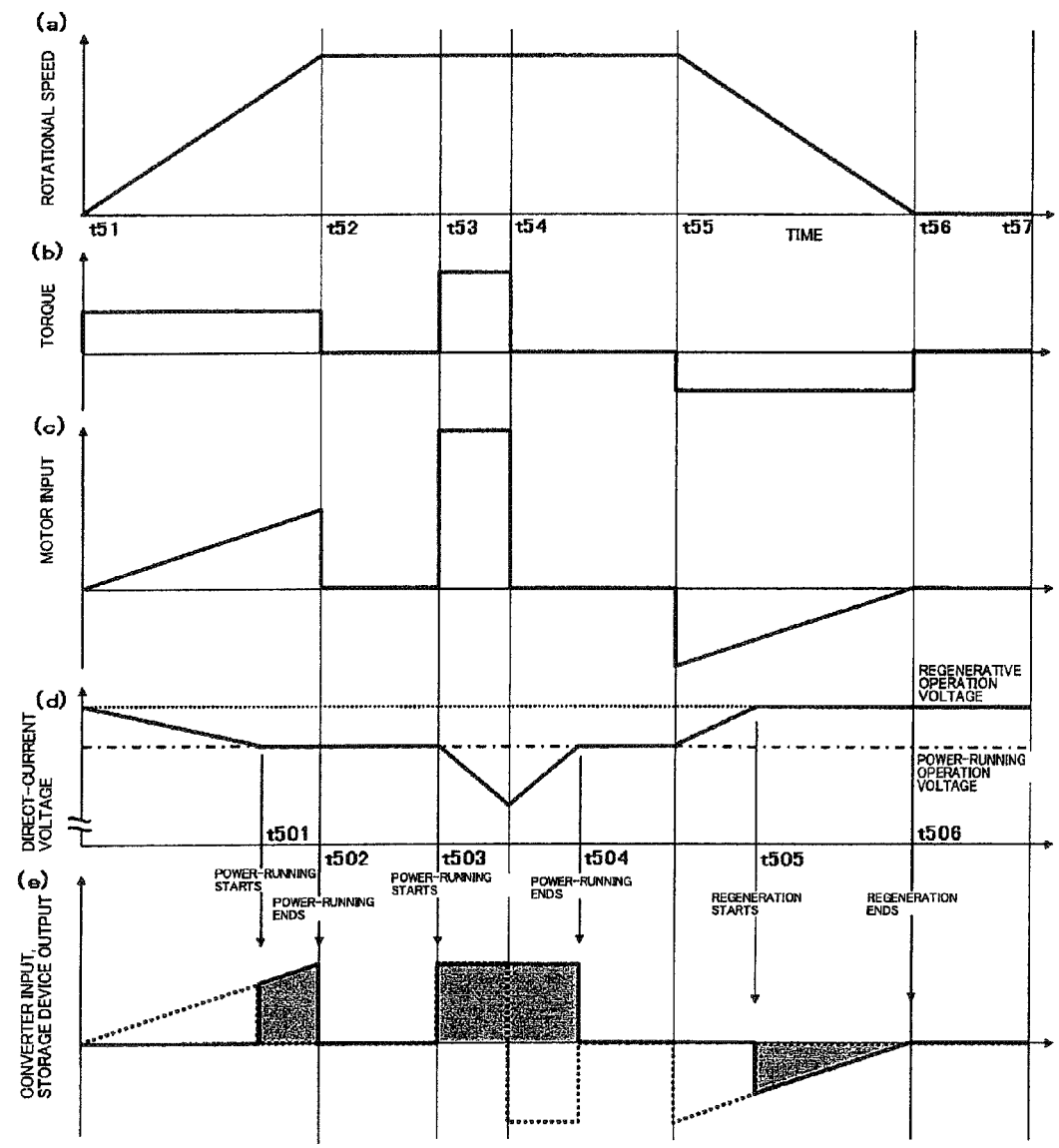
FIG. 5 is a timing chart illustrating Example 1 according to the above embodiment of the invention.

Example 1 illustrates a case where a press pattern (i.e., the operation of the motor) indicated by the motor rotational speed (a) in FIG. 5 is selected, and a high press load (motor load) is applied during a press operation (time t53 to time t54).

In FIG. 5, (a) indicates the rotational speed of the motor 11, (b) indicates the torque of the motor 11, (c) indicates the power required for the motor, (d) indicates the direct-current voltage Vd of the direct-current bus 24, the regenerative operation voltage Vr, and the power-running operation voltage Vm, and (e) indicates the power input to the power supply converter 31 (solid line) and the power output from the energy storage device 26 (broken line).

In Example 1, when pressing an identical workpiece using an identical die with identical productivity using the servo press machine 10, an identical load is repeatedly applied. In the example shown in FIG. 5, a pressing process (press pattern) from a time t51 to a time t57 is repeated. The period from the time t51 to the time t52 is an acceleration period, and the period from the time t52 to the time t55 is a constant speed period. A press load is applied from the time t53 to the time t54. The period from the time t55 to the time t56 is a deceleration period, and the speed reaches zero at the time t56. The period from the time t56 to the time t57 is a standby period.

As the torque of the motor 11, an acceleration torque is required from the time t51 to the time t52, a load torque is required from the time t53 to the time t54, and a deceleration torque is required from the time t55 to the time t56 (see (b) in FIG. 5). Since the motor input power is given by the product of the rotational speed and the torque (rotational speed× torque), the power indicated by (c) is required. The motor input power indicated by (c) is supplied by "power input to power supply converter 31 (solid line)+power output from energy storage device 26 (broken line)" (see (e)).

Since the power supply converter 31 does not operate at the time t51, the motor input power (see (c)) is supplied from the energy storage device 26. Therefore, the direct-current voltage Vd drops (see (d)). When the direct-current voltage Vd has dropped to a value equal to or lower than the power-running operation voltage Vm at the time t501, the power supply converter 31 starts the power-running operation ("power-running starts"). The direct-current voltage Vd is maintained at the same value until acceleration of the motor 11 ends (time t52). Specifically, the power required for the motor 11 is not supplied from the energy storage device 26, but is supplied from the power supply converter 31.

The motor input power becomes zero after acceleration has ended so that the direct-current voltage Vd rises to only a small extent. Specifically, the power supply converter 31 stops the power-running operation at a time t502 immediately after the time t52 ("power-running stops"). Since the power required for the motor is zero after the time t502, the direct-current voltage Vd is maintained constant. When a load torque is applied at the time t53, the power is supplied to the motor 11 from the direct-current bus 24 so that the direct-current voltage Vd drops to a value lower than the power-running operation voltage Vm. The power supply converter 31 starts the power-running operation at a time t503 immediately after the time t53 ("power-running starts").

In Example 1, since the power required for the motor 11 is larger than the power supplied from the power supply converter 31, power is also supplied from the energy storage device 26. In the example shown in FIG. 5, each of the power supply converter 31 and the energy storage device 26 supplies 50% of the power required for the motor 11. The direct-current voltage Vd continuously drops until the time t54 is reached. When the load is removed at the time t54, the power from the power supply converter 31 is supplied to only the energy storage device 26. The direct-current voltage Vd rises after the time t54. When the direct-current voltage Vd has exceeded the power-running operation voltage Vm at a time t504, the power supply converter 31 stops the power-running operation ("power-running stops").

When deceleration starts at the time t55 at which the power supply converter 31 does not operate, the regeneration energy from the motor 11 is supplied to the energy storage device 26. Therefore, the direct-current voltage Vd rises. When the direct-current voltage Vd has risen to a value equal to or higher than the regenerative operation voltage Vr at a time t505, the power supply converter 31 starts the regenerative operation ("regeneration starts"). The direct-current voltage Vd is controlled to a constant value from the time t505, and the regenerative power from the motor 11 is supplied from the power supply converter 31 to the alternating-current power supply (20).

When the motor 11 that has been decelerated from the time t55 stops at the time t56, the direct-current voltage Vd drops to only a small extent. Therefore, the power supply converter 31 stops the operation at a time t506 ("regeneration ends"). Since the power required for the motor is zero after the time t56, the direct-current voltage Vd is maintained constant.

As described above, the power required for the motor 11 is supplied from the power supply converter 31 and the energy storage device 26. The energy storage device 26 is positively involved in transfer of the power required for the motor, and it suffices to operate the power supply converter 31 only when the operating condition indicated by the direct-current voltage Vd is satisfied (the gray area in (e)).

Specifically, it suffices that the power supply converter 31 repeatedly start and stop the operation depending on the setting value (Vm or Vr) of the direct-current voltage (Vd) (i.e., operate only when the energy is required (i.e., the condition is satisfied)). Therefore, the amount of heat generated from the power supply converter 31 (e.g., power element) can be reduced so that a fin or the like that cools the power element can be reduced in size. Specifically, the continuous rating of the power supply converter 31 can be increased. Moreover, since a loss does not occur when the power supply converter 31 stops the operation, the operation efficiency of the power supply converter 31 is improved.

Note that an operation loss of the power supply converter 31, the inverter 41, and the energy storage device 26 occurs in the actual situation. Therefore, power is transferred taking account of the operation loss.

The power-running operation voltage Vm may be changed by the function of the power-running operation voltage setting change control section, and the regenerative operation voltage Vr may be changed by the function of the regenerative operation voltage setting change control section during the operation of the motor. In this case, the setting change timing (switch timing) may be determined from the relationship with the operation of the motor (i.e., the characteristics and the operation mode of the servo press machine 10). The power required for the motor 11 can be determined in advance (before operation). The voltage setting value and an optimum voltage change timing can be determined in advance by calculations or simulation based on the conversion capacity of the power supply converter 31 and the capacity of the energy storage device 26.

The voltage (Vm or Vr) is set based on the results, the change timing is determined from the rotation angle (or an angle corresponding to the rotation angle) of the crank shaft 14, and the voltage setting value is changed when the angle (or an angle instruction, time, or a value that corresponds thereto) is reached during operation. The voltage setting value and the change timing may be checked and corrected during trial press.

In this embodiment, the voltage setting value and the change timing may be automatically determined by the specification determination output sections 81, 82, and 84. The determined voltage setting value and change timing may be output to the voltage setting operation control section 60 as the voltage setting change instruction signal Svg (Svgm and Svgr) generated by the power-running operation voltage setting change control section and the regenerative operation voltage setting change control section.

The capacity of the energy storage device 26 can be further optimized by thus setting and changing the regenerative operation voltage Vr and the power-running operation voltage Vm. Specifically, the storage capacity of the energy storage device 26 can be effectively utilized and appropriately controlled. This is effective when using a large-capacity capacitor (e.g., large-capacity electrolytic capacitor or electric double-layer capacitor) or a combination of large-capacity capacitors as the energy storage device 26 of which the energy storage amount significantly affects the direct-current voltage Vd.

Note that the power supply regenerative operation time can be brought forward by lowering the regenerative operation voltage W. This is effective when the regenerative power from the motor 11 is large or the capacity of the energy storage device 26 is small.

According to the embodiments, the power-running operation voltage setting section 65, the power-running operation start control section, and the power-running operation stop control section are provided, and the power supply converter 31 is caused to start the power-running operation when the direct-current voltage Vd is equal to or lower than the power-running operation voltage Vm, and stop the power-running operation when the direct-current voltage Vd has exceeded the power-running operation voltage Vm. Therefore, the size, weight, and loss of the power supply converter 31 can be reduced so that an increase in efficiency can be achieved.

Moreover, the thermal rating can be reduced as compared with a related-art example that causes the power supply converter 31 to always operate. Specifically, the size of a cooling fin that cools the power element of the power supply converter 31 can be reduced while reducing a switching loss of the power element and its peripheral circuit, for example.

According to the embodiments, the regenerative operation voltage setting section 66, the regenerative operation start control section, and the regenerative operation stop control section are provided, and the power supply converter 31 is caused to start the regenerative operation when the direct-current voltage Vd is equal to or higher than the regenerative operation voltage Vr, and stop the regenerative operation when the direct-current voltage Vd is lower than the regenerative operation voltage Vr. Therefore, the capacity of the energy storage device 26 can be utilized to a maximum extent while optimizing the storage capacity of the energy storage device 26.

According to the embodiment, the power-running operation and the regenerative operation of the power supply converter 31 can be started and stopped by utilizing power-running operation control sections (power-running operation voltage setting section 65, power-running operation stop control section, and power-running operation voltage setting change control section) and regenerative operation control sections (regenerative operation voltage setting section 66, regenerative operation stop control section, and regenerative operation voltage setting change control section). Therefore, a reduction in size of the power supply converter 31, an increase in efficiency of the power supply converter 31, and optimization of the capacity of the energy storage device 26 can be achieved at the same time. This makes it possible to reduce the size and the cost of the motor drive control device 30.

According to the embodiment, the power-running operation voltage setting change control section is provided, and the power-running operation stop voltage Vmr and the power-running operation start voltage Vms can be changed depending on the operation of the motor (e.g., the press pattern of the pressing process and the motor load). Therefore, the operation of the power supply converter 31 can be finely controlled depending on the power required for the motor 11. Moreover, the size of the power supply converter 31 can be further reduced while further improving the operation efficiency.

This also applies to the regenerative operation voltage setting change control section. Therefore, the capacity of the energy storage device can be further optimized.

Since the energy storage device 26 is formed by a large-capacity electrolytic capacitor or an electric double-layer capacitor of which the energy storage amount significantly affects the direct-current voltage Vd, the energy storage device 26 can be easily implemented so that the performance can be further improved.

According to the embodiment, the specification determination output sections 81, 82, and 84 are provided, and the specification (power-running operation voltage Vm, regenerative operation voltage Vr, and information about the voltage setting change timing) can be automatically determined by calculations (or simulation or the like) based on the conversion capacity of the power supply converter 31 input using the operation section 83, the storage capacity of the energy storage device 26, and the press pattern set (or selected) using the pattern setting selection section 85. Therefore, the operator can easily operate the device.

Since the specification is displayed on the display section 84, it is possible to quantitatively determine the specification. This makes it possible to quickly and accurately set the power-running operation voltage Vm and the regenerative operation voltage Vr. Moreover, workability can be further improved (unmanned operation can be implemented) by employing a configuration in which the specification is set automatically.

Figure 6:
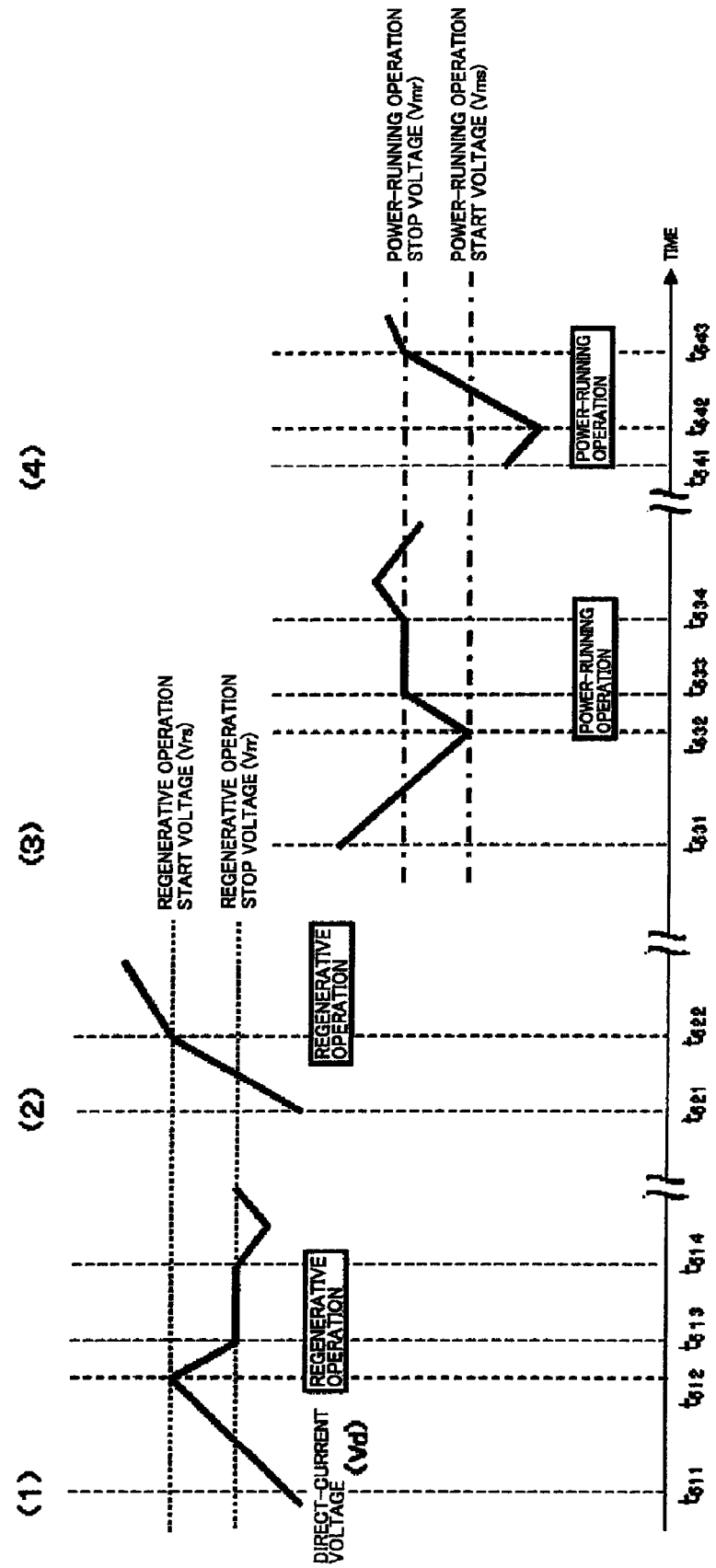
FIG. 6 is a timing chart illustrating a basic control operation of a motor drive control device according to another embodiment of the invention.
Figure 7:
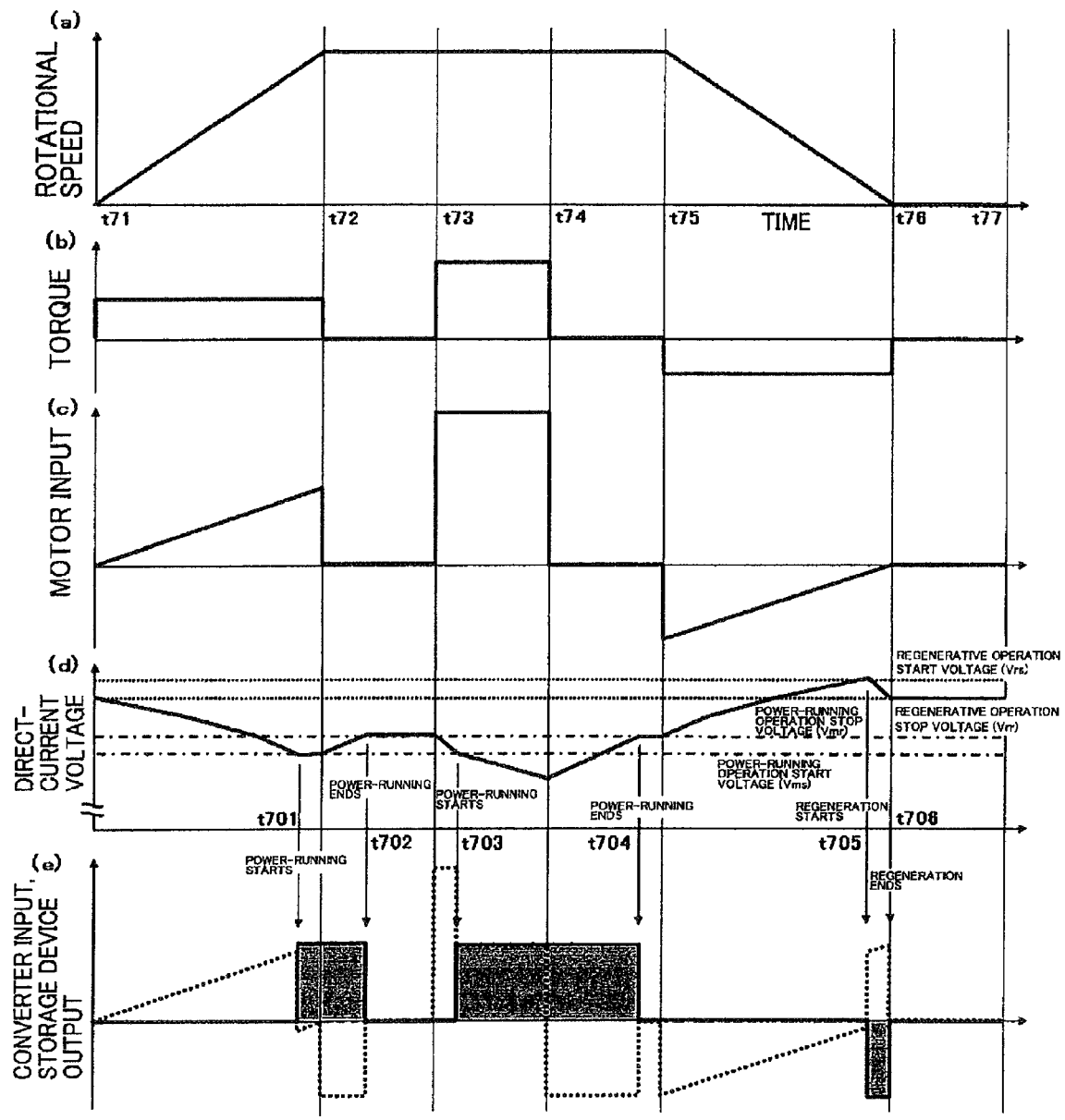
FIG. 7 is a timing chart illustrating Example 2 according to the embodiment of the invention.
Figure 8:
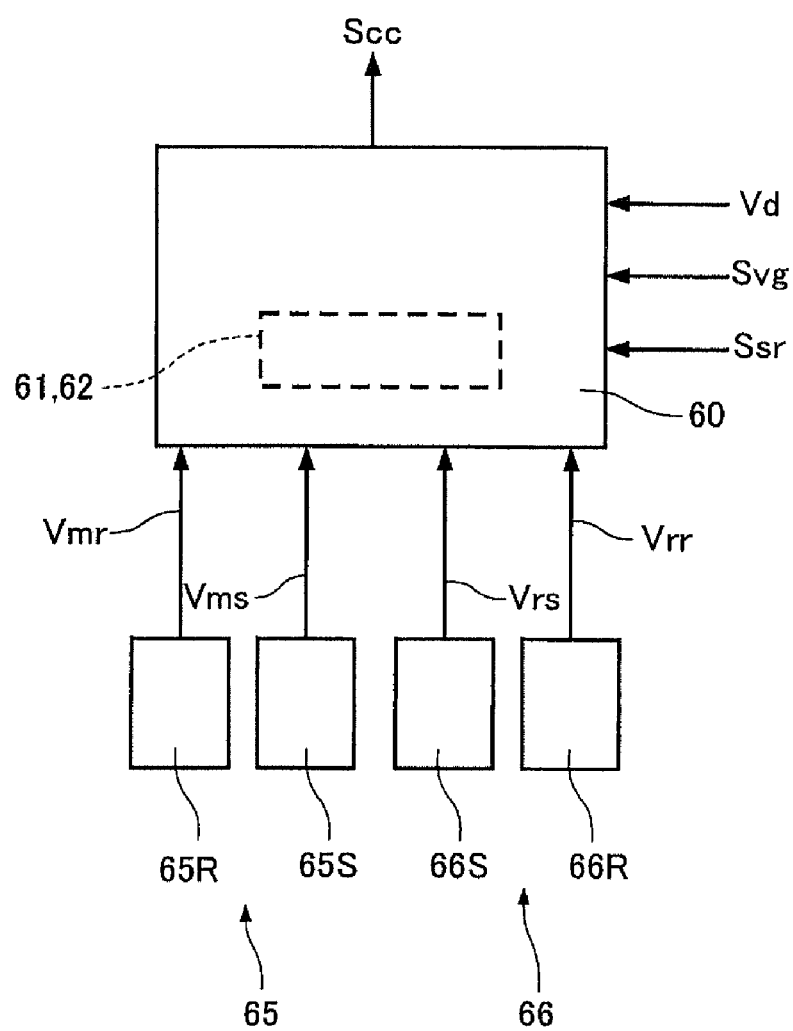
FIG. 8 is a block diagram illustrating a voltage setting section and a voltage setting operation control section according to the embodiment of the present invention.

FIGS. 6 to 8 show another embodiment of the invention. The basic configuration and function of this embodiment are the same as those of the first embodiment (FIG. 1, most of FIG. 2, part of FIG. 3, and FIG. 4). In this embodiment, however, the power-running operation voltage Vm is divided into a power-running operation start voltage Vms and a power-running operation stop voltage Vmr, and the regenerative operation voltage Vr is divided into a regenerative operation start voltage Vrs and a regenerative operation stop voltage Vrr, so that fine drive control can be implemented.

In FIG. 8, the voltage setting operation control section 60 includes a calculation section 61, a memory section 62, an operation section (not shown), a display section (not shown), an interface (not shown), and the like in the same manner as in the first embodiment (FIG. 1), and has a voltage setting function and an operation control function.

The power-running operation voltage setting section 65 includes a power-running operation start voltage setting section 65S and a power-running operation stop voltage setting section 65R, and the regenerative operation voltage setting section 66 includes a regenerative operation start voltage setting section 66S and a regenerative operation stop voltage setting section 66R.

The voltage setting function is implemented by setting the power-running operation start voltage Vms shown in FIG. 6 using the power-running operation start voltage setting section 65S, and setting the power-running operation stop voltage Vmr using the power-running operation stop voltage setting section 65R. The voltage setting function is also implemented by setting the regenerative operation start voltage Vrs using the regenerative operation start voltage setting section 66S, and setting the regenerative operation stop voltage Vrr using the regenerative operation stop voltage setting section 66R. The set values are stored in the storage area of the memory section 62. It is possible to set a plurality of values Vrs, Vrr, Vmr, and Vms. Note that the values Vrs, Vrr, Vmr, and Vms are set so that the relationship "Vrs>Vrr>Vmr>Vms" is satisfied (see FIGS. 6 and 7).

The voltage setting operation control section 60 extracts the voltages (Vms, Vmr, Vrs, and Vrr) corresponding to the operation instruction signal Ssr (including the signals that respectively specify the power-running operation start voltage Vms, the power-running operation stop voltage Vmr, the regenerative operation start voltage Vrs, and the regenerative operation stop voltage Vrr) input from the press drive control section 70 from a plurality of power-running operation start voltages Vms, power-running operation stop voltages Vmr, regenerative operation start voltages Vrs, and regenerative operation stop voltages Vrr stored in the storage area of the memory section 62, and stores the extracted voltages in the work area of the memory section 62.

The power-running operation start control section is configured in the same manner as in the above embodiment, but differ in function to some extent. In this embodiment, the power-running operation start control section causes the power supply converter 31 to start the power-running operation when the direct-current voltage Vd of the power supply converter 31 has reached the power-running operation start voltage Vms that is set using the power-running operation voltage setting section 65. The operation voltage determination section determines (in the same manner as in the step ST11 shown in FIG. 4) whether or not the detected direct-current voltage Vd has reached the power-running operation start voltage Vms.

The power-running operation stop control section causes the power supply converter 31 to stop the power-running operation when the direct-current voltage Vd has reached the power-running operation stop voltage Vmr. The operation voltage determination section determines (in the same manner as in the step ST11 shown in FIG. 4) whether or not the direct-current voltage Vd has reached the power-running operation stop voltage Vmr.

Note that the power-running operation start control section causes the power supply converter 31 to continuously perform the power-running operation until the direct-current voltage Vd reaches the power-running operation stop voltage Vmr. The power-running operation stop control section causes the power supply converter 31 to continuously suspend the power-running operation until the direct-current voltage Vd reaches the power-running operation start voltage Vms.

The power-running operation voltage setting change control section changes at least one of the power-running operation start voltage Vms and the power-running operation stop voltage Vmr depending on the operation of the motor 11 (i.e., the press pattern of the pressing process). The power-running operation voltage setting change control section is configured in the same manner as in the first embodiment.

The regenerative operation start control section is configured in the same manner as in the above embodiment, but differ in function to some extent. In this embodiment, the regenerative operation start control section causes the power supply converter 31 to start the regenerative operation when the direct-current voltage Vd of the power supply converter 31 has reached the regenerative operation start voltage Vrs that is set using the regenerative operation voltage setting section 66. The operation voltage determination section determines (ST11) whether or not the detected direct-current voltage Vd has reached the regenerative operation start voltage Vrs.

The regenerative operation stop control section causes the power supply converter 31 to stop the regenerative operation when the direct-current voltage Vd has reached the regenerative operation stop voltage Vrr. The operation voltage determination section determines (ST11) whether or not the detected direct-current voltage Vd has reached the regenerative operation stop voltage Vrr.

Note that the regenerative operation start control section causes the power supply converter 31 to continuously perform the regenerative operation until the direct-current voltage Vd reaches the regenerative operation stop voltage Vrr. The regenerative operation stop control section causes the power supply converter 31 to continuously suspend the regenerative operation until the direct-current voltage Vd reaches the regenerative operation start voltage Vrs.

The regenerative operation voltage setting change control section changes at least one of the regenerative operation start voltage Vrs and the regenerative operation stop voltage Vrr depending on the operation of the motor 11 (i.e., the press pattern of the pressing process). The regenerative operation voltage setting change control section is configured in the same manner as in the first embodiment.

Figure 3:
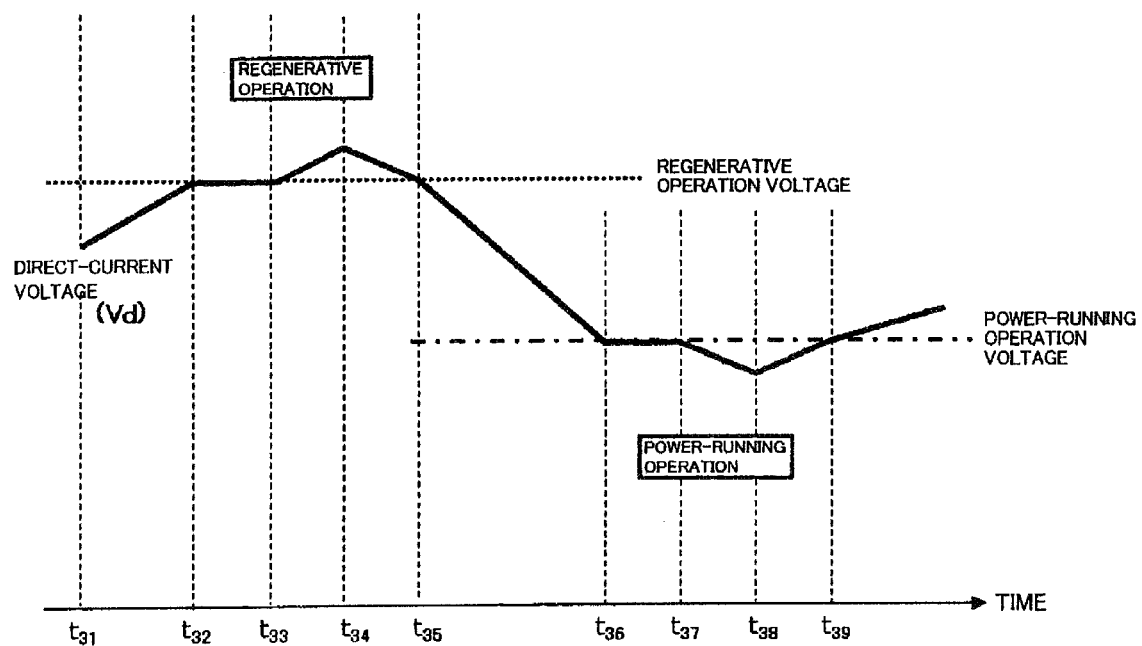
FIG. 3 is a timing chart illustrating a basic control operation according to the above embodiment of the invention.

In FIG. 6 (corresponding to FIG. 3 in the first embodiment), signals that cause the power supply converter to operate include the regenerative operation start voltage Vrs, the regenerative operation stop voltage Vrr, the power-running operation stop voltage Vmr, and the power-running operation start voltage Vms, differing from the first embodiment (FIG. 3). The regenerative operation start voltage Vrs, the regenerative operation stop voltage Vrr, the power-running operation stop voltage Vmr, and the power-running operation start voltage Vms are set so that the relationship "Vrs≧Vrr>Vmr≧Vms" is satisfied.

The power supply converter 31 starts the regenerative operation that returns to the alternating-current power supply (20) when the direct-current voltage Vd of the direct-current bus 24 has reached the regenerative operation start voltage Vrs, and stops the regenerative operation when the direct-current voltage Vd has reached the regenerative operation stop voltage Vrr. The power supply converter 31 starts the power-running operation that receives power from the alternating-current power supply (20) when the direct-current voltage Vd has reached the power-running operation start voltage Vms, and stops the power-running operation when the direct-current voltage Vd has reached the power-running operation stop voltage Vmr. Whether or not the direct-current voltage Vd has reached a given voltage may be determined while providing a small hysteresis.

A case where the direct-current voltage Vd is lower than the regenerative operation stop voltage Vrr at a time t611 ((1) in FIG. 6) is discussed below.

At the time t611, the power supply converter 31 does not operate, and the motor 11 performs the regenerative operation. Since the regeneration energy from the motor 11 is stored in the energy storage device 26, the direct-current voltage Vd rises. When the direct-current voltage Vd has reached the regenerative operation start voltage Vrs at a time t612, the voltage setting operation control section 60 that forms the regenerative operation start control section outputs the operation control signal Scc (regenerative operation start control signal Scrs) to the voltage control section 35.

The power supply converter 31 starts the regenerative operation based on the PWM control signal Spwm from the current control section 33. Specifically, the power supply converter 31 returns the regenerative power from the motor 11 to the alternating-current power supply (20). Therefore, the direct-current voltage Vd drops and almost reaches the regenerative operation stop voltage Vrr at a time t613. The voltage control section 35 controls the current control section 33 so that the voltage (Vd) is maintained.

When the direct-current voltage Vd has dropped to a value below the regenerative operation stop voltage Vrr at a time t614, the regenerative operation stop control section (voltage setting operation control section 60) outputs the operation control signal Scc (regenerative operation stop control signal Scrr) to the voltage control section 35, and the voltage control section 35 outputs the operation stop signal Sstp to the power supply converter 31. The power supply converter 31 then stops the regenerative operation. The power supply converter 31 performs the regenerative operation from the time t612 to the time t614, and stops operation in the remaining period. Power is supplied from the energy storage device 26 to the motor 11 depending on the power required for the motor 11.

Since the motor 11 sequentially performs the power-running operation and the regenerative operation after the time t614, the direct-current voltage Vd drops and then rises.

The direct-current voltage Vd is lower than the regenerative operation stop voltage Vrr at a time t621 (see (2)), and the motor 11 performs the regenerative operation in a state in which the power supply converter 31 does not operate.

The direct-current voltage Vd rises in this state. When the direct-current voltage Vd has reached the regenerative operation start voltage Vrs at a time t622, the voltage setting operation control section 60 that forms the regenerative operation start control section outputs the operation control signal Scc (regenerative operation start control signal Scrs) to the voltage control section 35. The power supply converter 31 then starts the regenerative operation. Specifically, the power supply converter 31 returns the regenerative power from the motor 11 to the alternating-current power supply (20). Since the regenerative power from the motor 11 is larger than the regenerative power returned to the alternating-current power supply (20) by the power supply converter 31, the energy storage device 26 absorbs the differential power so that the direct-current voltage Vd continuously rises. However, since the direct-current voltage Vd is higher than the regenerative operation start voltage Vrs, the power supply converter 31 performs the regenerative operation.

A case where the direct-current voltage Vd is higher than the power-running operation stop voltage Vmr at a time t631 (see (3)) is discussed below. In this case, the motor 11 performs the power-running operation, and to power supply converter 31 does not operate. Therefore, since the power required for the motor 11 is supplied from the energy storage device 26, the direct-current voltage Vd drops. When the direct-current voltage Vd has reached the power-running operation start voltage Vms at a time t632, the voltage setting operation control section 60 that forms the power-running operation start control section outputs the operation control signal Scc (power-running operation start control signal Scms) to the voltage control section 35. The voltage control section 35 outputs the current control signal Sci that causes the power supply converter 31 to start the power-running operation to the current control section 33. The current control section 33 then outputs the PWM control signal Spwm.

The power supply converter 31 then starts the power-running operation, and transmits power from the alternating-current power supply (20) to the motor. Therefore, the direct-current voltage Vd rises and almost reaches the power-running operation stop voltage Vmr at a time t633. The voltage control section 35 controls the current control section 33 so that the voltage (Vd) is maintained.

When the direct-current voltage Vd has exceeded the power-running operation stop voltage Vmr at a time t634, the voltage setting operation control section 60 that forms the power-running operation stop control section outputs the operation control signal Scc (power-running operation stop control signal Scmr) to the voltage control section 35, and the voltage control section 35 outputs the operation stop signal Sstp to the power supply converter 31. After the time t634, power is supplied from the energy storage device 26 to the motor 11 depending on the power required for the motor 11. Specifically, the power supply converter 31 performs the power-running operation from the time t632 to the time t634, and stops operation in the remaining period.

Since the motor 11 sequentially performs the regenerative operation and the power-running operation after the time t634, the direct-current voltage Vd rises and then drops.

A case where the direct-current voltage Vd is lower than the power-running operation start voltage Vms at a time t641 (see (4)) is discussed below. In this case, when the condition that the direct-current voltage Vd has reached the power-running operation start voltage Vms is satisfied, the voltage setting operation control section 60 that forms the power-running operation start control section outputs the operation control signal Scc (power-running operation start control signal Scms) to the voltage control section 35. The voltage control section 35 outputs the current control signal Sci that causes the power supply converter 31 to start the power-running operation to the current control section 33. The current control section 33 then outputs the PWM control signal Spwm. The power supply converter 31 then starts the power-running operation, and transmits power from the alternating-current power supply (20) to the motor.

In this example, since the power consumed by the motor 11 is larger than the power supplied from the power supply converter 31, the differential power is supplied from the energy storage device 26. Therefore, the direct-current voltage Vd continuously drops. The power consumed by the motor 11 decreases at a time t642 (i.e., the power supplied from the power supply converter 31 becomes larger than the power consumed by the motor 11) so that the direct-current voltage Vd rises.

When the direct-current voltage Vd has reached the power-running operation stop voltage Vmr at a time t643, the voltage setting operation control section 60 that forms the power-running operation stop control section outputs the operation control signal Scc (power-running operation stop control signal Scmr) to the voltage control section 35. The voltage control section 35 then outputs the operation stop signal Sstp. The power supply converter 31 stops the power-running operation. After the time t643, power is supplied from the energy storage device 26 to the motor 11 depending on the power required for the motor 11. In this example, the power supply converter 31 performs the power-running operation from the time t641 to the time t643, and stops the power-running operation after the time t643.

As described above, the power supply converter 31 starts the regenerative operation when the direct-current voltage Vd of the direct-current bus 24 has exceeded the regenerative operation start voltage Vrs, and stops the regenerative operation when the direct-current voltage Vd has reached the regenerative operation stop voltage Vrr. The power supply converter 31 starts the power-running operation when the direct-current voltage Vd has reached the power-running operation start voltage Vms, and stops the power-running operation when the direct-current voltage Vd has reached the power-running operation stop voltage Vmr. Specifically, the power supply converter 31 operates in the gray area shown in FIG. 7, and does not operate in the remaining period.

Specifically, the power supply converter 31 finely repeats the operation depending on the direct-current voltage Vd as compared with the first embodiment (FIG. 3) (i.e., the power supply converter 31 operate only in a period in which energy is required). Therefore, the amount of heat generated by the power element or the like of the power supply converter 31 can be reduced as compared with the above embodiment so that the size of a fin or the like can be reduced. Moreover, the capacity of the energy storage device 26 can be optimized.

When the regenerative power from the motor 11 is small and can be absorbed by the energy storage device 26, only the power-running operation stop voltage Vmr and the power-running operation start voltage Vms may be set without setting the regenerative operation start voltage Vrs and the regenerative operation stop voltage Vrr in the same manner as in the above embodiment. In this case, the power supply converter 31 may have only an AC/DC conversion function.

Example 2

The following example illustrates a case where a press pattern (i.e., the motor rotation pattern or the operation of the motor) indicated by the motor rotational speed (a) in FIG. 7 is selected, and a high press load is applied during a press operation (time t73 to time t74).

In FIG. 7, (a) indicates the rotational speed of the motor 11, (b) indicates the torque of the motor 11, (c) indicates the power required for the motor, (d) indicates the direct-current voltage Vd of the direct-current bus 24, the regenerative operation start voltage Vrs, the regenerative operation stop voltage Vrr, the power-running operation start voltage Vms, and the power-running operation stop voltage Vmr, and (e) indicates the power input to the power supply converter 31 (solid line) and the power output from the energy storage device 26 (broken line).

The period from the time t71 to the time t72 is an acceleration period, and the period from the time t72 to the time t75 is a constant speed period. A press (motor) load is applied from the time t73 to the time t74. The period from the time t75 to the time t76 is a deceleration period, and the rotational speed becomes zero at the time t76. The period from the time t76 to a time t77 is a standby period, and the pressing process ends at the time t77.

The motor 11 is driven at the rotational speed indicated by (a). As the torque of the motor 11, an acceleration torque is required from the time t71 to the time t72, a load torque is required from the time t73 to the time t74, and a deceleration torque is required from the time t75 to the time t76 (see (b) in FIG. 7). Since the motor input power is given by the product of the rotational speed and the torque (rotational speed× torque), the power indicated by (c) is required. The motor input power (i.e., the power required for the motor) indicated by (c) is supplied by "power input to power supply converter 31 (solid line)+power output from energy storage device 26 (broken line)" (see (e)).

Since the power supply converter 31 does not operate at the time t71, the motor input power (see (c)) is supplied from the energy storage device 26. Therefore, the direct-current voltage Vd drops (see (d)). When the direct-current voltage Vd has reached the power-running operation start voltage Vms at a time t701, the power supply converter starts the power-running operation ("power-running starts"). Therefore, the direct-current voltage Vd rises. Since the direct-current voltage Vd has not reached the power-running operation stop voltage Vmr at the time t72 at which acceleration of the motor 11 ends, the power supply converter 31 continuously performs the power-running operation. When the direct-current voltage Vd has reached the power-running operation stop voltage Vmr at a time t702, the power supply converter 31 stops the power-running operation ("power-running stops"). Since the power required for the motor 11 is zero, the voltage (Vd) is maintained.

When a load torque is applied at the time t73 at which the power supply converter 31 does not operate, the power required for the motor 11 is supplied from the energy storage device 26 (see (e)). Therefore, the direct-current voltage Vd drops (see (d)). When the direct-current voltage Vd has become lower than (has reached) the power-running operation start voltage Vms at a time t703, the power supply converter 31 starts the power-running operation ("power-running starts"). In this example, since the power required for the motor 11 is larger than the power supplied from the power supply converter 31, power is also supplied from the energy storage device 26.

Therefore, the direct-current voltage Vd continuously drops until the time t74 at which the press load is removed is reached. When the press load is removed at the time t74, the power from the power supply converter 31 is supplied to the energy storage device 26, and the direct-current voltage Vd continuously rises until a time t704 is reached.

When the direct-current voltage Vd has reached the power-running operation stop voltage Vmr at the time t704, the power supply converter 31 stops the power-running operation ("power-running ends"). The motor starts to be decelerated at the time t75. In this case, since the power supply converter 31 does not operate, the regeneration energy from the motor 11 is supplied to the energy storage device 26. Therefore, the direct-current voltage Vd rises.

When the direct-current voltage Vd has reached the regenerative operation start voltage Vrs at a time t705, the power supply converter 31 starts the regenerative operation ("regeneration starts"). Therefore, the direct-current voltage Vd drops. In this example, the direct-current voltage Vd reaches the regenerative operation stop voltage Vrr at a time t706 (time t76) so that the power supply converter 31 stops the regenerative operation ("regeneration ends"). Since the power required for the motor is zero after the time t76, the direct-current voltage Vd is maintained.

As described above, the power required for the motor 11 is supplied from the power supply converter 31 and the energy storage device 26. The energy storage device 26 is positively involved in transfer of the power required for the motor. The power supply converter 31 operates (transfers energy) only when the operating condition indicated by the direct-current voltage Vd is satisfied. In the example shown in FIG. 7, the power supply converter 31 operates only in the gray area (see (e)).

According to this embodiment, since fine adjustments can be made as compared with the first embodiment (FIGS. 3 and 5), the storage capacity of the energy storage device 26 can be more effectively utilized. Specifically, the energy storage device 26 can be more positively involved in transfer of the power required for the motor.

In FIG. 7, the power-running operation start voltage Vms, the power-running operation stop voltage Vmr, the regenerative operation start voltage Vrs, and the regenerative operation stop voltage Vrr are not changed when the motor operates. Note that one, some, or all of the power-running operation start voltage Vms, the power-running operation stop voltage Vmr, the regenerative operation start voltage Vrs, and the regenerative operation stop voltage Vrr may be changed. In this case, the voltage setting value and the voltage change timing may be determined by calculations or simulation in the same manner as in the above embodiments. The voltage setting value and the voltage change timing may be checked and corrected during trial press.

According to this embodiment, the power supply converter 31 starts the power-running operation when the direct-current voltage Vd has reached the power-running operation start voltage Vms, and stops the power-running operation when the direct-current voltage Vd has reached the power-running operation stop voltage Vmr. Therefore, the size of the power supply converter 31 can be reduced as compared with the above embodiments while further improving efficiency.

According to this embodiment, the power supply converter 31 starts the regenerative operation when the direct-current voltage Vd has reached the regenerative operation start voltage Vrs, and stops the regenerative operation when the direct-current voltage Vd has reached the regenerative operation stop voltage Vrr. Therefore, the energy storage device 26 can be further optimized as compared with the above embodiment.

According to this embodiment, the power-running operation and the regenerative operation of the power supply converter 31 can be started and stopped by utilizing power-running operation control sections (power-running operation voltage setting section 65, power-running operation start control section, and power-running operation stop control section) and regenerative operation control sections (regenerative operation voltage setting section 66, regenerative operation start control section, and regenerative operation stop control section). Therefore, a reduction in size of the power supply converter 31, an increase in efficiency of the power supply converter 31, and optimization of the capacity of the energy storage device 26 can be achieved as compared with the above embodiment.

According to this embodiment, the power-running operation voltage setting change control section is provided, and the power-running operation stop voltage Vmr and the power-running operation start voltage Vms can be changed depending on the operation of the motor (e.g., the press pattern of the pressing process). Therefore, the operation of the power supply converter 31 can be finely controlled. This also applies to the regenerative operation voltage setting change control section.

Figure 9:
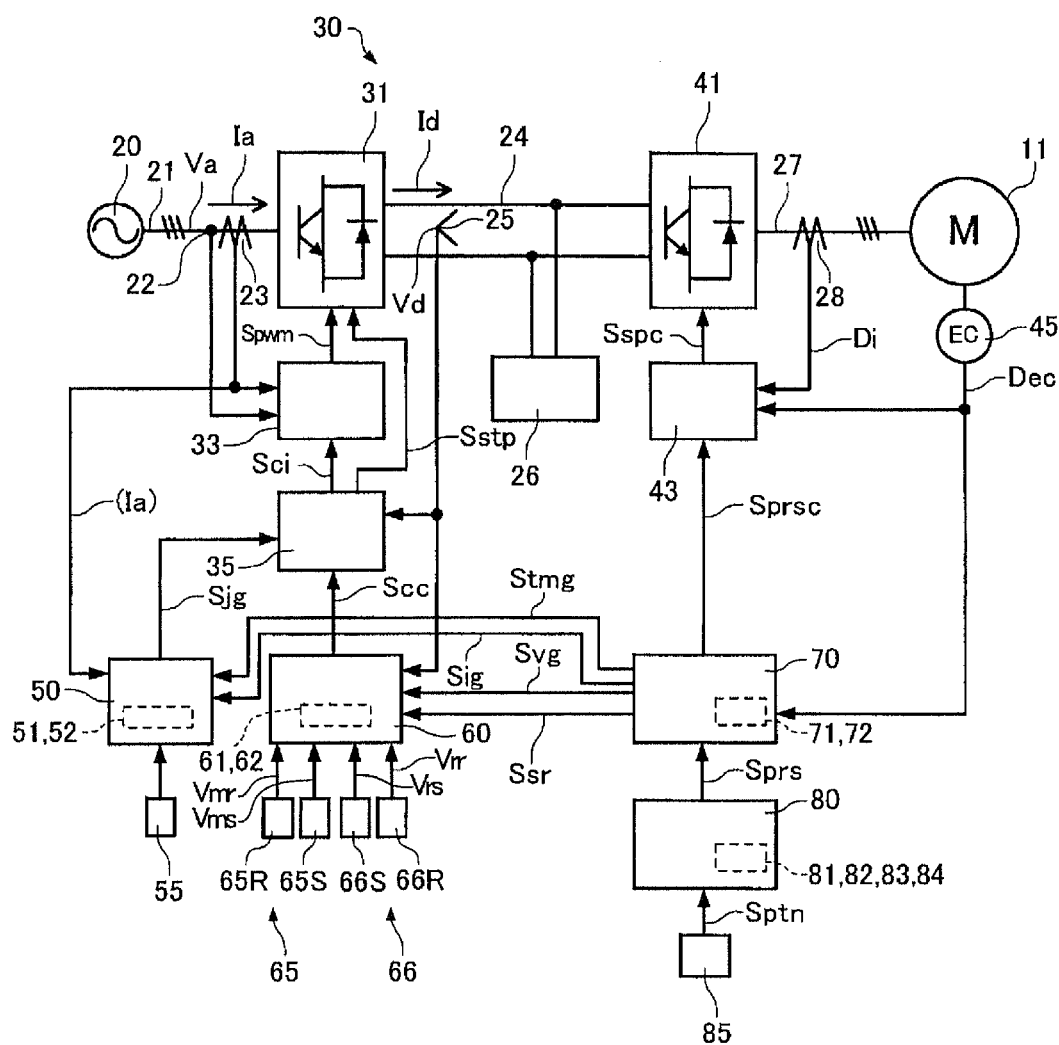
FIG. 9 is a circuit diagram illustrating a motor drive control device according to a further embodiment of the invention.
Figure 10:
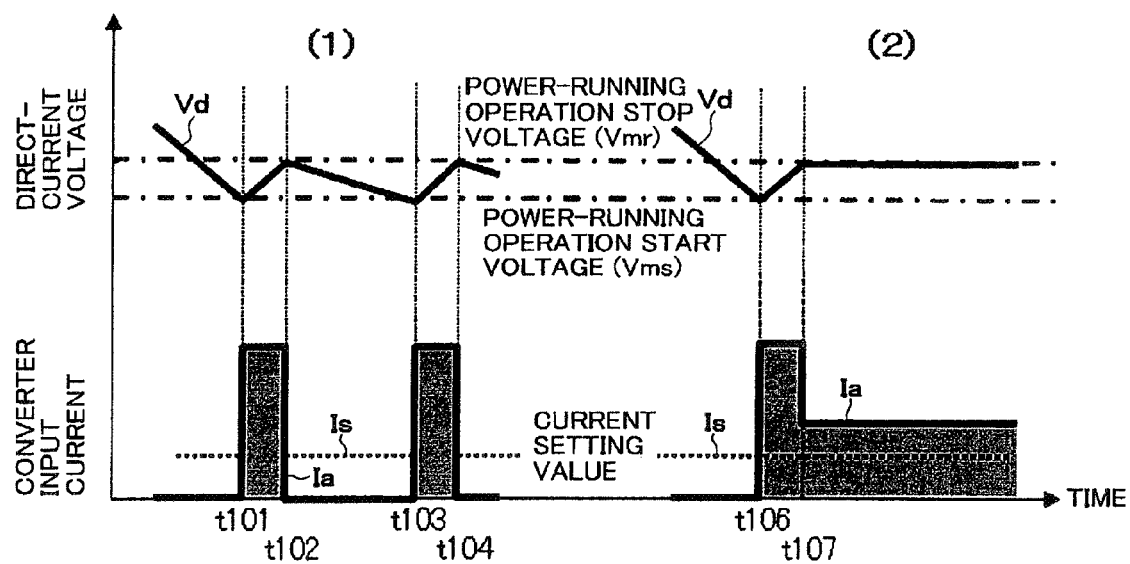
FIG. 10 is a timing chart illustrating an operation of compulsorily stopping a power supply converter and other operations according to the embodiment of the invention.
Figure 11:
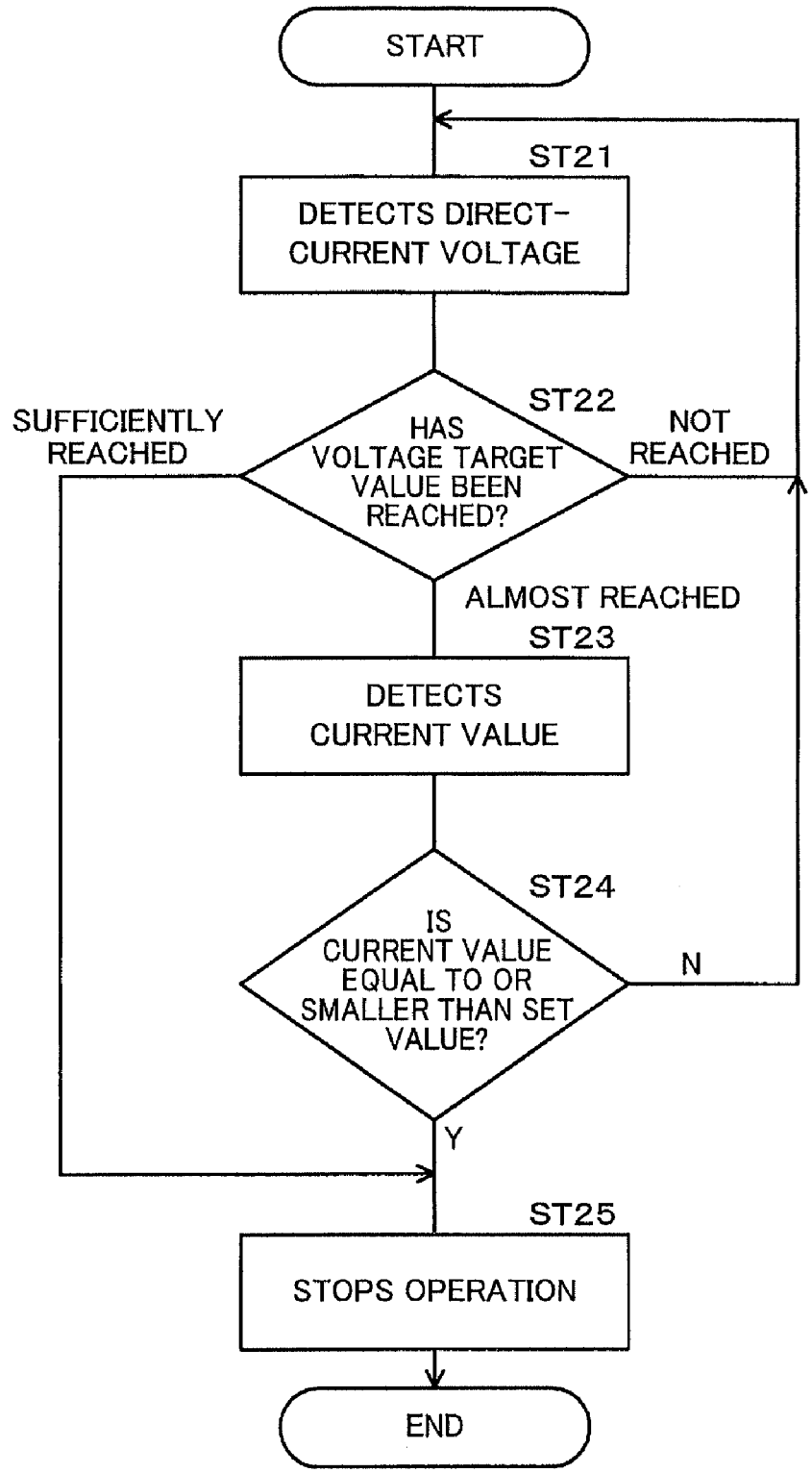
FIG. 11 is a flowchart illustrating an operation of compulsorily stopping a power supply converter and other operations according to the embodiment of the invention.

FIGS. 9 to 11 show a third embodiment of the invention. The basic configuration and function of this embodiment are the same as those of the second embodiment (FIGS. 1, 2, 7, and 8). In this embodiment, however, a current reference setting section 55, current determination sections 51 and 52, and compulsory operation stop control sections 51 and 52 are further provided, and the operation of the power supply converter 31 can be compulsorily stopped when the detected load current Ia has been determined be smaller than a current reference Is. Specifically, this embodiment is characterized by the operation when the target voltage (Vrr or Vmr) has been reached when the power supply converter 31 performs the power-running operation or the regenerative operation.

A current setting determination control section 50 shown in FIG. 9 includes a calculation section 51, a memory section 52, an operation section (not shown), a display section (not shown), an interface (not shown), and the like, and forms the current determination sections 51 and 52, the compulsory operation stop control sections 51 and 52, and operation continuation control sections 51 and 52 (described later).

The current reference setting section 55 is formed by a current setting section 55 shown in FIG. 9, and sets the current comparison/determination current reference Is. One or more current references Is set by the current reference setting section 55 is stored in the memory section 52. The value of the current reference Is used when the power supply converter 31 operates can be changed based on a current reference change instruction signal (including the value of the current reference Is that is changed) Sig. The current reference change instruction signal Sig is generated by current reference change instruction sections 71 and 72 corresponding to the current press pattern (motor operational state).

The change timing is determined based on a change timing signal Stmg generated by change timing signal generation sections 71 and 72 as a result of evaluating the current press pattern. The change timing signal Stmg is input to the current setting determination control section 50.

Reference value change sections 51 and 52 included in the current setting determination control section 50 extract the current reference value Is equal to the value (Is) designated by the reference value change instruction signal Sig from a plurality of setting current reference values Is stored in the memory section 52 at a timing based on the change timing signal Stmg, and determine the extracted current reference value Is to be the current reference used for the operation. Specifically, it is possible to change the current reference value Is corresponding to the motor operational state (press pattern).

Note that the current reference change instruction sections 71 and 72 and the change timing signal generation sections 71 and 72 may be integrally formed so that the signals Stmg and Sig are output in combination.

The current determination sections 51 and 52 operate when the direct-current voltage Vd detected by the voltage detector 25 has almost reached the target value (Vrr or Vmr) during the operation. Specifically, the current determination sections 51 and 52 compare the load current Ia of the power supply converter 31 detected by the current detector 23 with the current reference Is that has been set or changed to determine whether or not the detected load current Ia is smaller than the current reference Is (ST24 in FIG. 11).

The compulsory operation stop control sections 51 and 52 compulsorily stop the operation of the power supply converter 31 when the current determination sections 51 and 52 have determined that the detected load current Ia is smaller than the current reference Is (ST25). Specifically, the current setting determination control section 50 outputs the current determination signal Sgj to the voltage control section 35, and the voltage control section 35 outputs the operation stop signal Sstp to the power supply converter 31 so that the power supply converter 31 stops the operation. Note that the operation of the power supply converter 31 is stopped when the direct-current voltage Vd has reached the target value (Vrr or Vmr) (ST22). In this case, the operation of the power supply converter 31 is stopped using the operation stop signal Sstp.

The operation continuation control sections 51 and 52 operate when the current determination sections 51 and 52 have determined that the detected load current Ia is larger than the current reference Is (NO in ST24) so that the power supply converter 31 continuously operates. Specifically, the process returns to the step ST21 in FIG. 11.

Note that the power supply converter 31 continuously operates when the direct-current voltage Vd has not reached the target value (Vrr or Vmr) (ST22). Specifically, the process returns to the step ST21.

The operations are described below with reference to FIG. 11. A target arrival operation processing program shown in FIG. 11 is executed when the power supply converter 31 operates. Specifically, the direct-current voltage Vd is detected (ST21), and whether or not the direct-current voltage Vd has reached the target value (regenerative operation stop voltage Vrr or power-running operation stop voltage Vmr) is determined (ST22). When the direct-current voltage Vd has sufficiently reached the target value ("sufficiently reached" in ST22), the operation of the power supply converter 31 is stopped (ST25) (END). The expression "sufficiently reached" refers to the case where the direct-current voltage Vd is sufficiently lower than the target value (Vrr) during the regenerative operation, or the direct-current voltage Vd is sufficiently higher than the target value (Vmr) during the power-running operation.

When the direct-current voltage Vd has almost reached the target value (Vrr or Vmr) ("almost reached" in ST22), the alternating current value Ia is detected (ST23). When the current value Ia is smaller than the current reference value Is (YES in ST24), the regenerative operation or the power-running operation of the power supply converter 31 is stopped (ST25) (END). When the direct-current voltage Vd has not reached the target value (Vrr or Vmr) ("not reached" in ST22), or the current value Ia is larger than the current reference value Is (NO in ST24), the process returns to the step ST21.

Specifically, whether or not to stop the operation of the power supply converter 31 is determined by determining whether or not the alternating current value Ia is larger than the set value Is around the time when the direct-current voltage Vd has almost reached the target value (Vrr or Vmr). When the alternating current value Ia is smaller than the set value Is (i.e., the motor load is low), the alternating current Ia decreases. Therefore, the operation of the power supply converter 31 is stopped. When the alternating current value Ia is larger than the set value Is (i.e., the motor load is high), it is necessary to continue power regeneration to the alternating-current power supply (20) or power supply from the alternating-current power supply (20). Therefore, the power supply converter 31 continuously operates.

(1) in FIG. 10 indicates the operation when the direct-current voltage Vd has almost reached the power-running operation stop voltage (Vmr) ("almost reached" in ST22 in FIG. 11) when the power supply converter 31 performs the power-running operation. When the direct-current voltage Vd has reached the power-running operation start voltage Vms at a time t101, the power supply converter 31 starts the power-running operation. The direct-current voltage Vd almost reaches the power-running operation stop voltage Vmr at a time t102. At the time t102, the current value Ia is almost zero, and is smaller than the set value Is. Therefore, the power-running operation is compulsorily stopped. Accordingly, the direct-current voltage Vd gradually drops. When the direct-current voltage Vd has reached the power-running operation start voltage Vms at a time t103, the power supply converter 31 starts the power-running operation. The subsequent operation is the same as described above.

As indicated by (2) in FIG. 10, when the direct-current voltage Vd has reached the power-running operation start voltage Vms at a time t106, the power supply converter 31 starts the power-running operation. The direct-current voltage Vd almost reaches the power-running operation stop voltage Vmr at a time t107. At the time t107, since the current value Ia indicated by a solid line (gray area) is larger than the set value Is indicated by a broken line, the power supply converter 31 continuously performs the power-running operation, and supplies the current Ia so that almost the target value Vmr is maintained.

Although the examples indicated by (1) and (2) in FIG. 10 utilize the power-running operation stop voltage Vmr, the above control can also be performed when the direct-current voltage Vd reaches the regenerative operation stop voltage Vrr.

As described above, since whether or not to stop the operation of the power supply converter 31 is determined based on the current value Ia when the direct-current voltage Vd has almost reached the target value Vmr (or Vrr), the operation of the power supply converter 31 is stopped when energy is not required, and is not stopped when energy is required. Specifically, whether or not to stop the operation of the power supply converter 31 can be finely selected depending on whether or not energy is required. Therefore, the amount of heat generated by the power element or the like of the power supply converter 31 can be further reduced. Moreover, the deviation of the direct-current voltage Vd from the target value Vmr (or Vrr) can be reduced.

According to this embodiment, the current reference setting section 55, the current determination sections 51 and 52, and the compulsory operation stop control sections 51 and 52 are provided in addition to the configuration according to the second embodiment, and the operation of the power supply converter 31 can be compulsorily stopped when it has been determined that the detected load current Ia is smaller than the current reference Is. Therefore, the power supply converter 31 can be finely operated or stopped while achieving the same effects as those of the embodiments. As a result, the size and the weight of the power supply converter 31 can be further reduced while further improving efficiency.

Since the current reference value Is can be changed corresponding to the motor operational state (press operational state), the size and the weight of the power supply converter 31 can be further reduced while further improving efficiency so that adaptability increases.

Although the above embodiment has been described taking an example in which the alternating-current power supply current Ia is detected (ST23), it is possible to detect the output current Id of the power supply converter 41 instead of the alternating-current power supply current Ia. The current set value (ST24) may be appropriately changed corresponding to the voltage target value (Vrr or Vmr). In this case, the operation of the power supply converter 31 can be more finely controlled.

The target arrival operation processing program (flowchart) shown in FIG. 11 may also be applied to the other embodiments. Whether or not the voltage target value has been reached can be determined (ST22) by providing an appropriate determination width to the target value.

The embodiments have been described taking an example in which the motor drive control device 30 is used as a motor drive device of a servo press machine. Note that the motor drive control device 30 is not limited thereto. The motor drive control device 30 may be used as a device that drives a motor that is changed in rotational speed or applied torque and is used for an injection molding machine, a robot, a machine tool, a textile machine, a loading machine, an elevator, a construction machine, a steel rolling machine, and the like.

The invention is very effective for an arbitrary device that drives industrial machines.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A motor drive control device including a power supply converter that is connected to an alternating-current power supply, a voltage detector that detects a direct-current voltage of the power supply converter, an inverter that is connected to a motor, and an energy storage device that is connected to a direct-current bus that connects the power supply converter and the inverter, the motor drive control device comprising:

a power-running operation voltage setting section that sets a power-running operation voltage of the power supply converter;

a power-running operation start control section that causes the power supply converter to start a power-running operation when the direct-current voltage of the power supply converter is equal to or lower than the power-running operation voltage set by the power-running operation voltage setting section;

a power-running operation stop control section that causes the power supply converter to stop the power-running operation when the direct-current voltage of the power supply converter has exceeded the power-running operation voltage set by the power-running operation voltage setting section;

a regenerative operation voltage setting section that sets a regenerative operation voltage of the power supply converter;

a regenerative operation start control section that causes the power supply converter to start a regenerative operation when the direct-current voltage of the power supply converter is equal to or higher than the regenerative operation voltage set by the regenerative operation voltage setting section; and a regenerative operation stop control section that causes the power supply converter to stop the regenerative operation when the direct-current voltage of the power supply converter is lower than the regenerative operation voltage set by the regenerative operation voltage setting section.

2. The motor drive control device as defined in claim 1, further comprising:

at least one of a power-running operation voltage setting change control section that changes the power-running operation voltage depending on the operational state of the motor and a regenerative operation voltage setting change control section that changes the regenerative operation voltage depending on the operational state of the motor.

3. The motor drive control device as defined in claim 1, further comprising:

a current reference setting section that sets a current reference;

a current determination section that compares a detected load current of the power supply converter with the current reference set by the current reference setting section to determine whether or not the detected load current is smaller than the current reference; and a compulsory operation stop control section that compulsorily stops the operation of the power supply converter when the current determination section has determined that the detected load current is smaller than the current reference.

4. The motor drive control device as defined in claim 3, wherein the value of the current reference can be changed corresponding to the operational state of the motor.

5. A motor drive control device including a power supply converter that is connected to an alternating-current power supply, a voltage detector that detects a direct-current voltage of the power supply converter, an inverter that is connected to a motor, and an energy storage device that is connected to a direct-current bus that connects the power supply converter and the inverter, the motor drive control device comprising:

a power-running operation start voltage setting section that sets a power-running operation start voltage of the power supply converter;

a power-running operation start control section that causes the power supply converter to start a power-running operation when the direct-current voltage of the power supply converter has reached the power-running operation start voltage set by the power-running operation start voltage setting section;

a power-running operation stop voltage setting section that sets a power-running operation stop voltage of the power supply converter;

a power-running operation stop control section that causes the power supply converter to stop the power-running operation when the direct-current voltage of the power supply converter has reached the power-running operation stop voltage set by the power-running operation stop voltage setting section;

a regenerative operation start voltage setting section that sets a regenerative operation start voltage of the power supply converter;

a regenerative operation start control section that causes the power supply converter to start a regenerative operation when the direct-current voltage of the power supply converter has reached the regenerative operation start voltage set by the regenerative operation start voltage setting section;

a regenerative operation stop voltage setting section that sets a regenerative operation stop voltage of the power supply converter; and a regenerative operation stop control section that causes the power supply converter to stop the regenerative operation when the direct-current voltage of the power supply converter has reached the regenerative operation stop voltage set by the regenerative operation stop voltage setting section.

6. The motor drive control device as defined in claim 5, further comprising:
a power-running operation voltage setting change control section that changes at least one of the power-running operation start voltage and the power-running operation stop voltage depending on the operational state of the motor; and
a regenerative operation voltage setting change control section that changes at least one of the regenerative operation start voltage and the regenerative operation stop voltage depending on the operational state of the motor.

7. The motor drive control device as defined in claim 5, further comprising:
a current reference setting section that sets a current reference;
a current determination section that compares a detected load current of the power supply converter with the current reference set by the current reference setting section to determine whether or not the detected load current is smaller than the current reference; and
a compulsory operation stop control section that compulsorily stops the operation of the power supply converter when the current determination section has determined that the detected load current is smaller than the current reference.

8. The motor drive control device as defined in claim 7, wherein the value of the current reference can be changed corresponding to the operational state of the motor.

9. The motor drive control device as defined in claim 1, being a motor drive control device of a servo press machine that presses a workpiece in a processing area while moving a slide upward and downward by driving the motor.

10. The motor drive control device as defined in claim 2, being a motor drive control device of a servo press machine that presses a workpiece in a processing area while moving a slide upward and downward by driving the motor,
wherein the operational state of the motor is determined depending on a press pattern in a pressing process of the servo press machine.

11. The motor drive control device as defined in claim 10, further comprising:
a current reference setting section that sets a current reference;
a current determination section that compares a detected load current of the power supply converter with the current reference set by the current reference setting section to determine whether or not the detected load current is smaller than the current reference; and
a compulsory operation stop control section that compulsorily stops the operation of the power supply converter when the current determination section has determined that the detected load current is smaller than the current reference.

12. The motor drive control device as defined in claim 11, wherein the value of the current reference can be changed corresponding to the operational state of the servo press machine.

13. The motor drive control device as defined in claim 5, being a motor drive control device of a servo press machine that presses a workpiece in a processing area while moving a slide upward and downward by driving the motor.

14. The motor drive control device as defined in claim 6, being a motor drive control device of a servo press machine that presses a workpiece in a processing area while moving a slide upward and downward by driving the motor,
wherein the operational state of the motor is determined depending on a press pattern in a pressing process of the servo press machine.

15. The motor drive control device as defined in claim 14, further comprising:
a current reference setting section that sets a current reference;
a current determination section that compares a detected load current of the power supply converter with the current reference set by the current reference setting section to determine whether or not the detected load current is smaller than the current reference; and
a compulsory operation stop control section that compulsorily stops the operation of the power supply converter when the current determination section has determined that the detected load current is smaller than the current reference.

16. The motor drive control device as defined in claim 15, wherein the value of the current reference can be changed corresponding to the operational state of the servo press machine.

* * * * *